United States Patent
Wu

(10) Patent No.: US 11,090,563 B2
(45) Date of Patent: Aug. 17, 2021

(54) OBJECT SELECTION METHOD, TERMINAL AND STORAGE MEDIUM

(71) Applicant: TENCENT TECHNOLOGY (SHENZHEN) COMPANY LTD, Shenzhen (CN)

(72) Inventor: Dong Wu, Shenzhen (CN)

(73) Assignee: TENCENT TECHNOLOGY (SHENZHEN) COMPANY LTD, Shenzhen (CN)

(*) Notice: Subject to any disclaimer, the term of this patent is extended or adjusted under 35 U.S.C. 154(b) by 96 days.

(21) Appl. No.: 16/661,270

(22) Filed: Oct. 23, 2019

(65) Prior Publication Data

US 2020/0054947 A1 Feb. 20, 2020

Related U.S. Application Data

(63) Continuation of application No. PCT/CN2018/114529, filed on Nov. 8, 2018.

(30) Foreign Application Priority Data

Nov. 15, 2017 (CN) .......................... 201711132666.2

(51) Int. Cl.
*A63F 13/537* (2014.01)

(52) U.S. Cl.
CPC .................. *A63F 13/537* (2014.09)

(58) Field of Classification Search
CPC .................................................. A63F 13/537
USPC .......................................................... 463/31
See application file for complete search history.

(56) References Cited

U.S. PATENT DOCUMENTS

| | | | |
|---|---|---|---|
| 8,210,943 B1* | 7/2012 | Woodard | A63F 13/422 463/31 |
| 2007/0270215 A1* | 11/2007 | Miyamoto | A63F 13/837 463/32 |
| 2013/0241829 A1 | 9/2013 | Kim | |
| 2014/0066195 A1* | 3/2014 | Matsui | A63F 13/06 463/30 |

(Continued)

FOREIGN PATENT DOCUMENTS

| | | |
|---|---|---|
| CN | 105194873 A | 12/2015 |
| CN | 105597325 A | 5/2016 |
| CN | 107029428 A | 8/2017 |

(Continued)

OTHER PUBLICATIONS

International Search Report for PCT/CN2018/114529 dated Feb. 1, 2019 [PCT/ISA/210].

*Primary Examiner* — Jay Trent Liddle
*Assistant Examiner* — Ryan Hsu
(74) *Attorney, Agent, or Firm* — Sughrue Mion, PLLC

(57) ABSTRACT

An object selection method, applied to a terminal, is provided. A graphic user interface including at least one virtual object is displayed. At least one candidate virtual object to which a skill is released, is determined from the at least one virtual object according to an object selection instruction, to obtain a candidate object set. A deviation parameter of each candidate virtual object in the candidate object set is obtained, the deviation parameter being relative to a reference object. At least one target virtual object to which the skill is released is selected, from the candidate object set according to the deviation parameter.

17 Claims, 20 Drawing Sheets

(56) References Cited

U.S. PATENT DOCUMENTS

2015/0231509 A1* 8/2015 McMain, II ............ A63F 13/55
                                                    463/31
2016/0129345 A1* 5/2016 Seok .................... A63F 13/426
                                                    463/31

FOREIGN PATENT DOCUMENTS

CN    107837529 A    3/2018
JP    2007-215756 A  8/2007

* cited by examiner

OBJECT SELECTION METHOD, TERMINAL AND STORAGE MEDIUM

CROSS-REFERENCE TO RELATED APPLICATION(S)

This application is a continuation application of International Application No. PCT/CN2018/114529, filed on Nov. 8, 2018, which claims priority to Chinese Patent Application No. 201711132666.2, entitled "OBJECT SELECTION METHOD AND APPARATUS, TERMINAL, AND STORAGE MEDIUM" filed with the China National Intellectual Property Administration on Nov. 15, 2017, the disclosures of which are incorporated by reference in their entireties.

BACKGROUND

1. Field

Example embodiments of the disclosure relate to the field of communications technologies, and particularly, to an object selection method, a terminal, and a storage medium.

2. Description of the Related Art

Intelligent terminals have processing capability that becomes increasingly stronger, to derive many applications that implement control based on human-machine interaction on intelligent terminal screens. In a process of implementing control based on human-machine interaction, different interaction modes may be run by using various group establishment forms, such as one-to-one, one-to-many, and many-to-many, between a plurality of users, to obtain different interaction results. For example, in a graphic user interface obtained through rendering on an intelligent terminal screen, after a plurality of users is divided into a plurality of different groups, information exchange between different groups may be performed by using control processing in human-machine interaction, and different interaction results are obtained according to responses to information exchange. Information exchange may be performed between group members of a same group by using control processing in human-machine interaction, and different interaction results are obtained according to responses to information exchange.

In an information exchange process, particular capability may be triggered to be released for a virtual object, to enrich representation forms and content of information. Different information representation forms and content finally lead to different interaction results. However, in the existing technology, an object to which a skill (or capability) is released can be determined only based on an accurate operation by a user. When the operation of the user deviates even little (that is, the operation of the user includes any error, even if minor), the object to which a skill is released cannot be determined. As a result, an interaction result deviates and is inaccurate. In addition, to generate a correct interaction result, a user needs to continuously adjust the operation until the operation meets accurate operation requirements. In the operation adjustment process, a terminal continuously responds to the adjustment operation of the user. Consequently, resource consumption of the terminal is large.

SUMMARY

One or more example embodiments provide an object selection method, a terminal, and a storage medium, which provide an interaction result with high efficiency and accuracy.

According to an aspect of an example embodiment, provided is an object selection method, applied to a terminal. A graphic user interface including at least one virtual object is displayed. At least one candidate virtual object to which a skill is released, is determined from the at least one virtual object according to an object selection instruction, to obtain a candidate object set. A deviation parameter of each candidate virtual object in the candidate object set is obtained, the deviation parameter being relative to a reference object. At least one target virtual object to which the skill is released is selected, from the candidate object set according to the deviation parameter.

The candidate object set may include at least two candidate virtual objects, and the selecting may include: obtaining selection weights of the at least two candidate virtual objects according to respective deviation parameters of the at least two candidate virtual objects, to obtain a selection weight of each candidate virtual object in the candidate object set; and selecting, from the candidate object set according to the selection weight of each candidate virtual object, the at least one target virtual object to which the skill is released.

The deviation parameter may include at least one of a deviation angle relative to the reference object and a deviation distance relative to the reference object, and the obtaining the selection weights of the at least two candidate virtual objects may include: obtaining weight reference parameters of the at least two candidate virtual objects according to the at least one of the deviation angle and the deviation distance; and obtaining the selection weights of the at least two candidate virtual objects according to the weight reference parameters of the at least two candidate virtual objects.

The candidate object set may include one candidate virtual object, and the selecting may include: determining whether the deviation parameter of the one candidate virtual object meets a preset condition; and selecting the candidate virtual object as the at least one target virtual object to which the skill is released based on the deviation parameter satisfying the preset condition.

The determining the at least one candidate virtual object may include: obtaining a field of view of a camera component according to the object selection instruction, the camera component being configured to render a scene in the graphic user interface; and determining, from the at least one virtual object according to the field of view, the candidate virtual object to which the skill is to be released.

The graphic user interface may further include a skill operation area, the skill operation area including a skill object, and the determining the candidate virtual object may include: triggering generating the object selection instruction based on detection of a skill release trigger operation of the skill object; and determining, from the at least one virtual object according to the object selection instruction, the candidate virtual object to which the skill is released.

The triggering the generating the object selection instruction may include: displaying a skill release auxiliary control object at a preset location on the graphic user interface based on detection of the skill release trigger operation; and controlling, according to an operation on the skill release auxiliary control object, a skill release location of the skill object to be adjusted in the graphic user interface and triggering the object selection instruction.

The skill release auxiliary control object may include a skill release control aperture object and a virtual joystick object located within a radiation range of the skill release control aperture object, and the operation on the skill release auxiliary control object may include a drag operation on the virtual joystick object, and the object selection method may further include: performing a skill release operation of releasing the skill on the at least one target virtual object based on detection of the drag operation on the virtual joystick object.

The graphic user interface may further include a skill operation area, the skill operation area including a skill object, and the determining the candidate virtual object may include: automatically triggering generating the object selection instruction in a predetermined release mode; and determining, from the at least one virtual object according to the object selection instruction, the candidate virtual object to which the skill is released.

According to an aspect of an example embodiment, provided is a terminal, including: at least one memory operable to store program code; and at least one processor operable to read the program code and operate as instructed by the program code, the program code including: displaying code configured to cause at least one of the at least one processor to display a graphic user interface, the graphic user interface including at least one virtual object; determining code configured to cause at least one of the at least one processor to determine, from the at least one virtual object according to an object selection instruction, at least one candidate virtual object to which a skill is released, to obtain a candidate object set; obtaining code configured to cause at least one of the at least one processor to obtain a deviation parameter of each candidate virtual object in the candidate object set, the deviation parameter being relative to a reference object; and selecting code configured to cause at least one of the at least one processor to select, from the candidate object set according to the deviation parameter, at least one target virtual object to which the skill is released.

The candidate object set may include at least two candidate virtual objects, and the selecting code may cause at least one of the at least one processor to perform: obtaining selection weights of the at least two candidate virtual objects according to respective deviation parameters of the at least two candidate virtual objects, to obtain a selection weight of each candidate virtual object in the candidate object set; and selecting, from the candidate object set according to the selection weight of each candidate virtual object, the at least one target virtual object to which the skill is released.

The deviation parameter may include at least one of a deviation angle relative to the reference object and a deviation distance relative to the reference object, and the obtaining the selection weights of the at least two candidate virtual objects: obtaining weight reference parameters of the at least two candidate virtual objects according to the at least one of the deviation angle and the deviation distance; and obtaining the selection weights of the at least two candidate virtual objects according to the weight reference parameters of the at least two candidate virtual objects.

The candidate object set may include one candidate virtual object, and the selecting code may cause at least one of the at least one processor to perform: determining whether the deviation parameter of the one candidate virtual object meets a preset condition; and selecting the one candidate virtual object as the at least one target virtual object to which the skill is released based on the deviation parameter satisfying the preset condition.

The determining code may cause at least one of the at least one processor to perform: obtaining a field of view of a camera component according to the object selection instruction, the camera component being configured to render a scene in the graphic user interface; and determining, from the at least one virtual object according to the field of view, the candidate virtual object to which the skill is to be released.

The graphic user interface may further include a skill operation area, the skill operation area including a skill object, and the determining code may cause at least one of the at least one processor to perform: triggering generating the object selection instruction based on detection of a skill release trigger operation of the skill object; and determining, from the at least one virtual object according to the object selection instruction, the candidate virtual object to which the skill is released.

According to an aspect of an example embodiment, provided is a non-volatile computer readable storage medium, storing computer readable instructions executable by at least one processor to perform: displaying a graphic user interface, the graphic user interface including at least one virtual object; determining, from the at least one virtual object according to an object selection instruction, at least one candidate virtual object to which a skill is released, to obtain a candidate object set; obtaining a deviation parameter of each candidate virtual object in the candidate object set, the deviation parameter being relative to a reference object; and selecting, from the candidate object set according to the deviation parameter, at least one target virtual object to which the skill is released.

The candidate object set may include at least two candidate virtual objects, and in the selecting the at least one target virtual object, the computer readable instructions may further cause the at least one processor to perform: obtaining selection weights of the at least two candidate virtual objects according to respective deviation parameters of the at least two candidate virtual objects, to obtain a selection weight of each candidate virtual object in the candidate object set; and selecting, from the candidate object set according to the selection weight of each candidate virtual object, the at least one target virtual object to which the skill is released.

The deviation parameter may include at least one of a deviation angle relative to the reference object and a deviation distance relative to the reference object, and in the obtaining the selection weights of the at least two candidate virtual objects, the computer readable instructions may further cause the at least one processor to perform: obtaining weight reference parameters of the at least two candidate virtual objects according to the at least one of the deviation angle and the deviation distance; and obtaining the selection weights of the at least two candidate virtual objects according to the weight reference parameters of the at least two candidate virtual objects.

The candidate object set may include one candidate virtual object, and in selecting the at least one target virtual object, the computer readable instructions may further cause the at least one processor to perform: determining whether the deviation parameter of the one candidate virtual object meets a preset condition; and selecting the one candidate virtual object as the at least one target virtual object to which the skill is released based on that the deviation parameter satisfying the preset condition.

In determining the at least one candidate virtual object, the computer readable instructions may further cause the at least one processor to perform: obtaining a field of view of a camera component according to the object selection instruction, the camera component being configured to render a scene in the graphic user interface; and determining, from the at least one virtual object according to the field of view, the at least one candidate virtual object to which the skill is to be released.

BRIEF DESCRIPTION OF THE DRAWINGS

To describe the technical solutions of the embodiments of the disclosure more clearly, the following briefly introduces the accompanying drawings required for describing the embodiments. Apparently, the accompanying drawings in the following description show only some embodiments of the disclosure, and a person of ordinary skill in the art may still derive other drawings from these accompanying drawings without creative efforts.

DETAILED DESCRIPTION

The following clearly and completely describes the technical solutions in the example embodiments of the disclosure with reference to the accompanying drawings in the embodiments of the disclosure. Apparently, the described embodiments are some embodiments of the disclosure rather than all of the embodiments. All other embodiments obtained by a person skilled in the art based on the embodiments of the disclosure without creative efforts shall fall within the protection scope of the disclosure.

Figure 1:
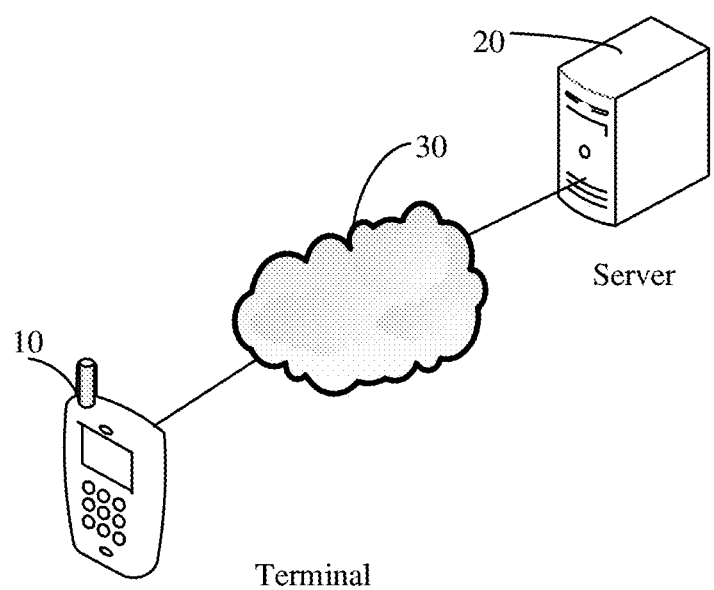
FIG. 1 is a schematic scene diagram of an information exchange system according to an example embodiment.

Referring to FIG. 1, an example embodiment provides an information interaction system, including a terminal 10 and a server 20. The terminal 10 is connected to the server 20 through a network 30. The network 30 includes network entities such as a router and a gateway, which are not shown in the figure. The terminal 10 may exchange information with the server 20 through a wired network or a wireless network, to download an application, an updated data packet of the application, data information or service information related to the application, and the like from the server 20. The terminal 10 may be a device such as a mobile phone, a tablet computer, or a notebook computer. FIG. 1 uses an example in which the terminal 10 is a mobile phone. Various applications required by a user may be installed in the terminal 10, such as an application with an entertainment function (such as a video application, an audio playback application, a game application, or reader software), and an application with a service function (such as a map navigation application or a group purchasing application).

Based on the foregoing system shown in FIG. 1, using a game scenario as an example, the terminal 10 downloads a game application, an updated data packet of the game application, data information or service information related to the game application, and the like from the server 20 through the network 30 according to requirements. According to an example embodiment, after starting the game application to enter a game interface (the game interface includes at least one virtual object) obtained through rendering, the terminal 10 may determine, in the at least one virtual object, a candidate virtual object to which a skill is released, to obtain a candidate object set, obtains a deviation parameter of the candidate virtual object in the candidate object set relative to a reference object, and selects, from the candidate object set according to the deviation parameter, a target virtual object to which a skill is released. The target virtual object to which a skill is released may be selected based on the deviation parameter of the virtual object relative to the reference object, the user can quickly and accurately determine the object to which a skill is released without performing an accurate skill release operation, thereby improving accuracy of an interaction result and generation efficiency of the interaction result, and reducing resources of the terminal.

The example in FIG. 1 is merely an example of a system architecture for implementing the embodiments of the disclosure, and the embodiments of the disclosure are not limited to the system architecture shown in FIG. 1. The embodiments of the disclosure are proposed based on the system architecture.

Figure 2:
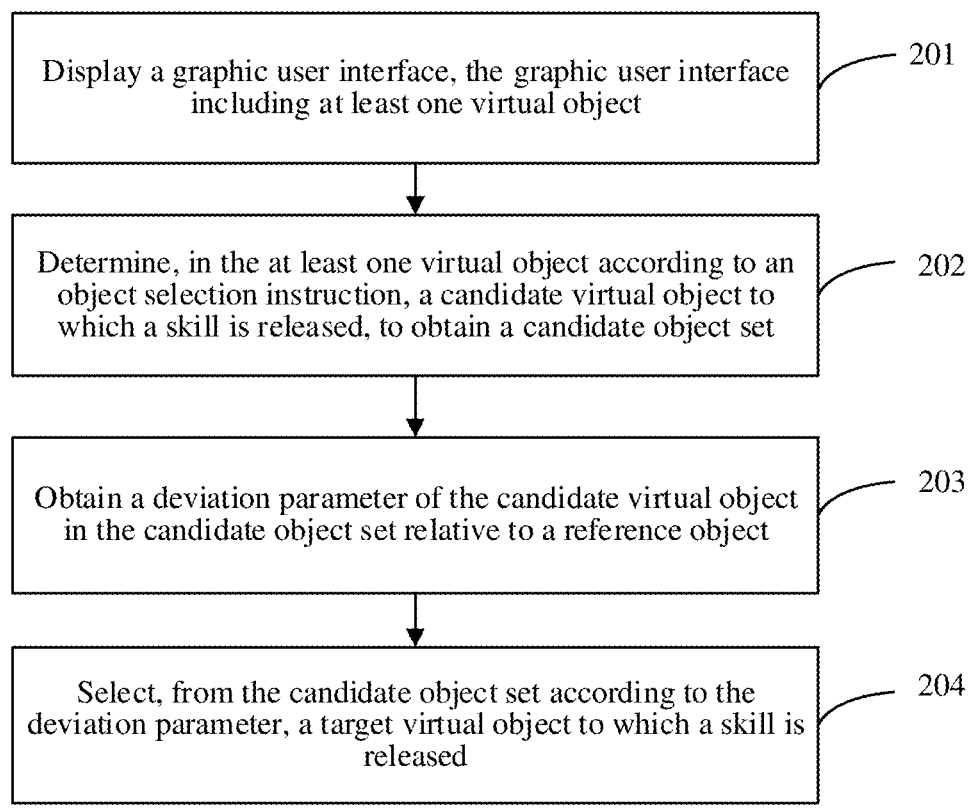
FIG. 2 is a schematic flowchart of an object selection method according to an example embodiment.

In an embodiment, an object selection method is provided and may be performed by a processor of the terminal. As shown in FIG. 2, the object selection method includes the following operations:

201: Display a graphic user interface, the graphic user interface including at least one virtual object.

For example, software application is executed on the processor of the terminal, and is rendered on a display of the terminal, to obtain the graphic user interface. The at least one virtual object may be obtained through rendering in the graphic user interface.

The graphic user interface may include various scene pictures, for example, a game picture and a social picture. The scene picture may be a two-dimensional picture or a three-dimensional picture.

The virtual object is a virtual resource object and may be a virtual object in the graphic user interface. The virtual object may include various types of objects in the graphic user interface. For example, the virtual object may include a virtual character object (such as a user role object representing a player user and a role object representing a robot) representing a character, objects such as a building, a tree, a cloud, and tower defend representing backgrounds, and the like.

Figure 3:
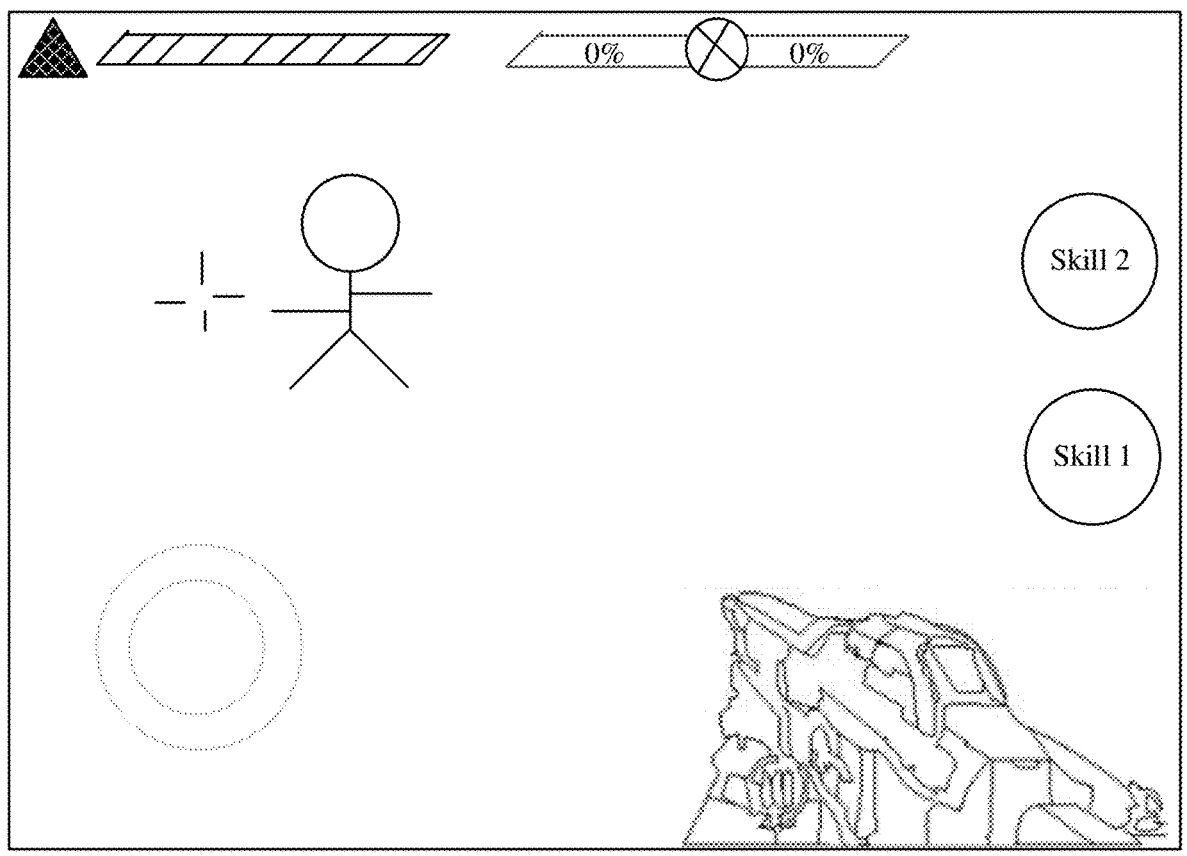
FIG. 3 is a schematic diagram of a first game interface according to an example embodiment.

In an embodiment, the virtual object may be a virtual character object. For example, referring to FIG. 3, when the graphic user interface is a game interface of a first-person shooter (FPS), the game interface includes a plurality of virtual character objects. The virtual character objects may be a virtual enemy character role object, that is, an enemy target. In addition, as shown in FIG. 3, the game interface may further include virtual objects such as a building, sky, and a cloud representing backgrounds, an object representing a user status (such as a hit point and vitality), virtual objects representing a user skill, equipment and the like, and a direction key object representing controlling a user location to move and change, such as a round virtual joystick. In other embodiments, the virtual object may include a virtual character object, a virtual background object, and the like.

202: Determine, among the at least one virtual object according to an object selection instruction, a candidate virtual object to which a skill is released, to obtain a candidate object set.

For example, the object selection instruction may be obtained, and then the candidate virtual object to which a skill is released is determined among the at least one virtual object according to the object selection instruction.

The candidate object set may include one or more candidate virtual objects.

For example, a candidate virtual character object to which a capability is released may be determined among at least one virtual character object, to obtain a candidate object set.

In an embodiment, the candidate virtual object may be determined based on a field of view of a camera component of a scene picture in the graphic user interface. The camera component is configured to render a corresponding scene picture in the graphic user interface. The camera component may be a rendering component in unity, and the camera component may display a corresponding picture in the graphic user interface according to a configured height, width, and field of view.

For example, in a game, the camera component is a component for a user player to capture and display a scene picture. There may be an unlimited quantity of camera components, such as two camera components, in one scene picture, and the camera components may be configured to render the scene picture in any sequence.

The operation of "determining, among the at least one virtual object according to an object selection instruction, a candidate virtual object to which a skill is released" may include the following operations:

obtaining a field of view of a camera component according to the object selection instruction, the camera being a reference object; and determining, among the at least one virtual object according to the field of view, the candidate virtual object to which a skill is released.

Figure 4:
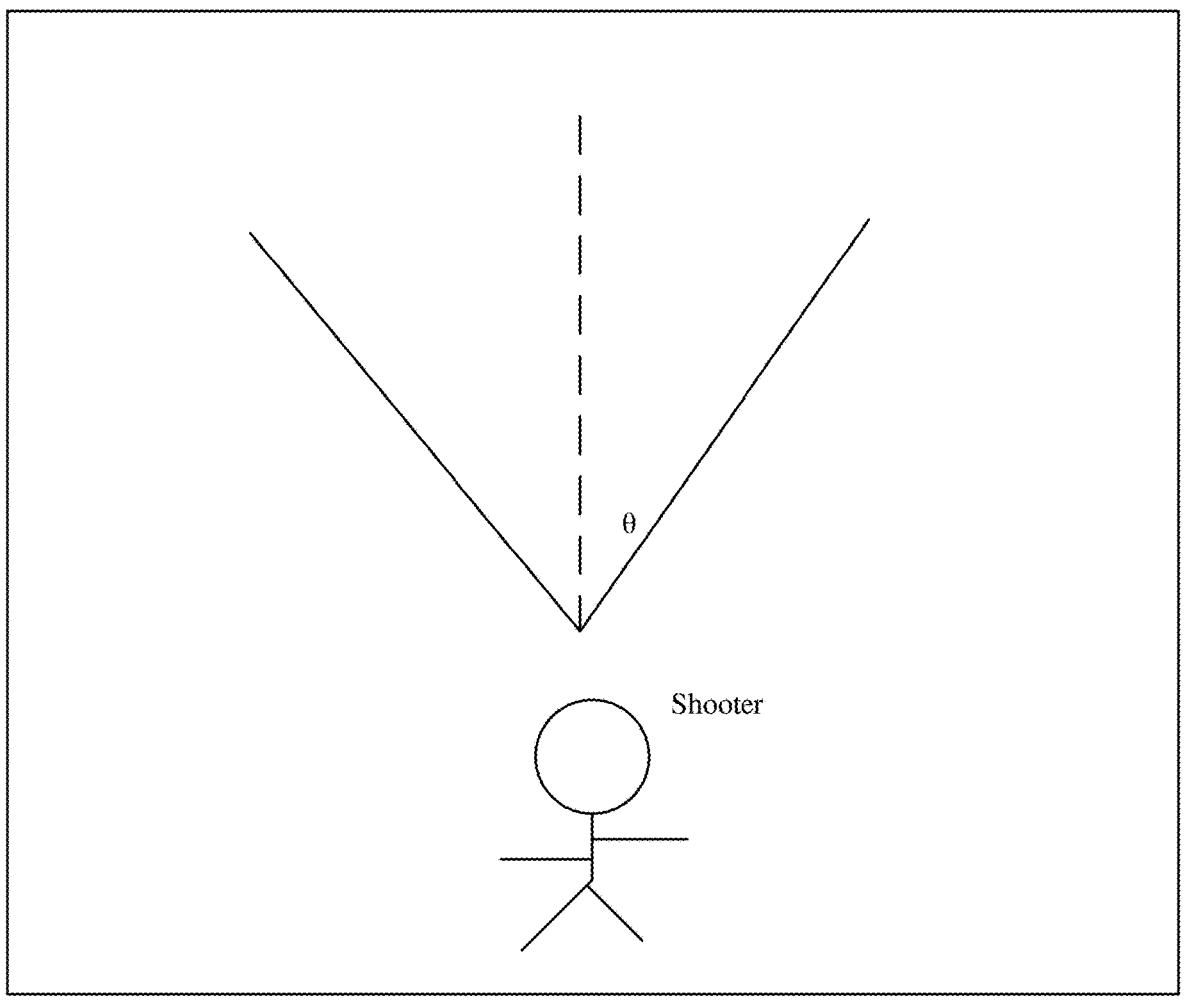
FIG. 4 is a schematic diagram of a field of view of a camera according to an example embodiment.

The field of view of the camera component is also referred to as a field of view (FOV), and the camera component renders an angle range of the scene picture. The field of view may be 40 degrees, 50 degrees, and the like. Although the camera component may not be a physical camera component, achieved functions may be the same as those of a physical camera. The field of view of the camera component is equivalent to a field of view of a physical camera. The field of view of the physical camera may use a lens of the camera as a vertex and use an angle formed by two edges of a maximum range that an image of a measured target can pass and that is of a lens. Using an FPS game as an example, referring to FIG. 4, the field of view of the camera component in the FPS game is a field of view of a shooter. In this case, the field of view is 2θ.

Because the field of view of the camera component matches a user perspective, the candidate virtual object is selected through the field of view of the camera component, to improve selection accuracy of the target object to which a skill is released, accuracy of interaction result output, and user experience.

Figure 5:
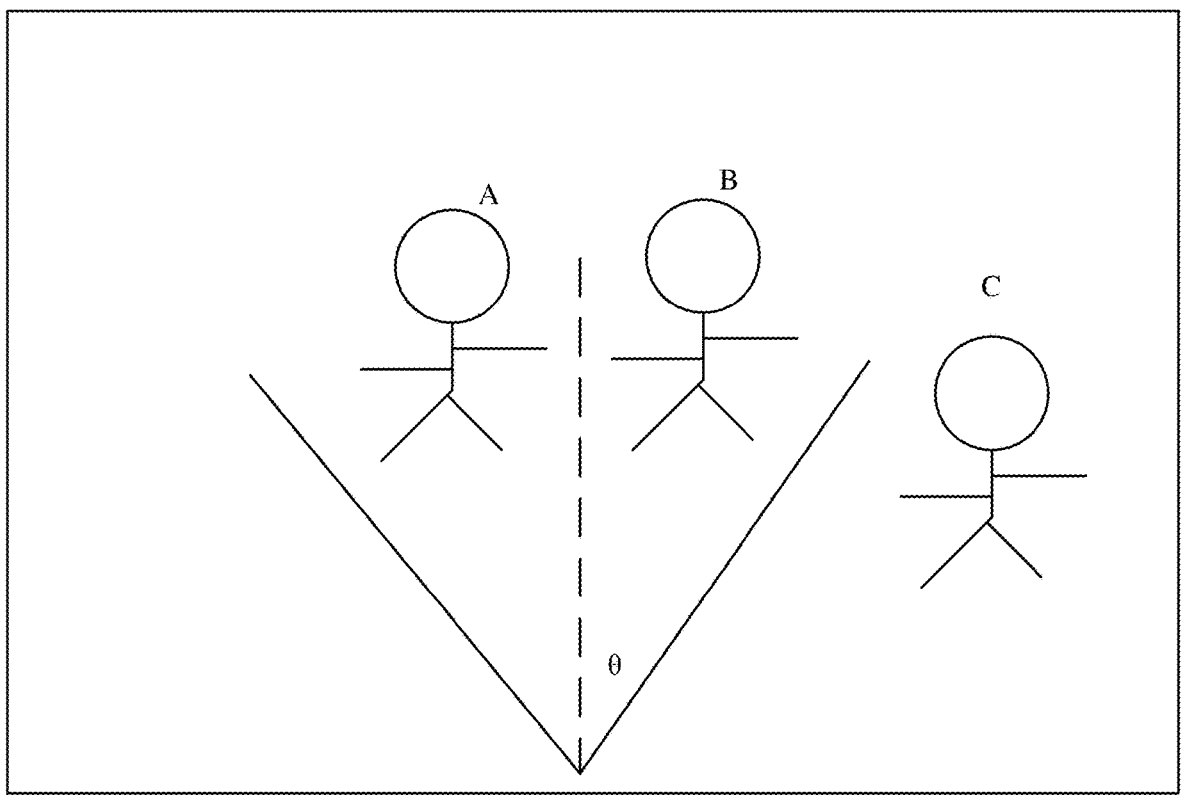
FIG. 5 is a schematic diagram of selecting a candidate virtual object according to an example embodiment.

In an embodiment, a virtual object outside a visual field may be removed, and the candidate virtual object to which a skill is released is determined in virtual objects within the visual field, that is, a virtual object located within a field-of-view range of the camera component is selected as the candidate virtual object. Referring to FIG. 5, it is assumed that there are virtual objects A, B, and C. It may be learned from the figure that the virtual objects A and B are located within the field-of-view range, and the virtual object C is located outside the field-of-view range. In this case, the virtual objects A and B are determined as candidate virtual objects to which a skill is released.

In an example embodiment of the disclosure, a plurality of manners for triggering the object selection instruction may be used. For example, two modes: triggering performed by a user operation and automatic triggering may be included.

In an embodiment, in a mode of triggering performed by a user operation, a skill operation area may be set in the graphic user interface. When it is detected that the user performs a corresponding operation in the skill operation area, the object selection instruction may be triggered to be generated.

For example, in an embodiment, to help the user perform a skill release operation, prevent a large quantity of mis-operations (or erroneous or unintended operations) from occurring, and improve precision and accuracy of interaction processing, a skill object may further be set in the skill operation area, and the user may trigger to generate the object selection instruction by performing an operation on the skill object. That is, the step of "determining, in the at least one virtual object according to an object selection instruction, a candidate virtual object to which a skill is released" may include the following steps:

triggering generating the object selection instruction in a case that a skill release trigger operation of the skill object is detected; and determining, in the at least one virtual object according to the object selection instruction, the candidate virtual object to which a skill is released.

The skill object may be an object representing a skill in the graphic user interface, such as a skill key. The skill release trigger operation of the skill object may include: pressing the skill object, such as long-pressing the skill object. When the user long-presses the skill key, the terminal triggers to generate the object selection instruction.

To accurately perform the skill release operation on the skill object, to prevent a large quantity of mis-operations (or erroneous or unintended operations) from occurring, thereby improving precision and accuracy of interaction processing, in an embodiment, auxiliary control objects such as a virtual joystick object and an operation aperture may also be provided, to help the user fast and accurately trigger skill release. Specifically, in a case that the skill release trigger operation of the skill object is detected, a skill release auxiliary control object is displayed at a preset location on the graphic user interface, and the object selection instruction is triggered to be generated. A skill release location of the skill object is controlled to be correspondingly adjusted in the graphic user interface according to an operation on the skill release auxiliary control object, and the object selection instruction is triggered.

In an embodiment, to facilitate a user operation and improve accuracy of skill release, thereby improving human-machine interaction and accuracy of an interaction result, the skill release auxiliary control object may include a skill release control aperture object and a virtual joystick object located within a radiation range of the skill release control aperture object.

In a case that a drag operation on the virtual joystick object is detected, the skill release location of the skill object is controlled to be correspondingly adjusted in the graphic user interface, and the object selection instruction is re-triggered, and the operation of determining the candidate virtual object is returned to.

Figure 6:
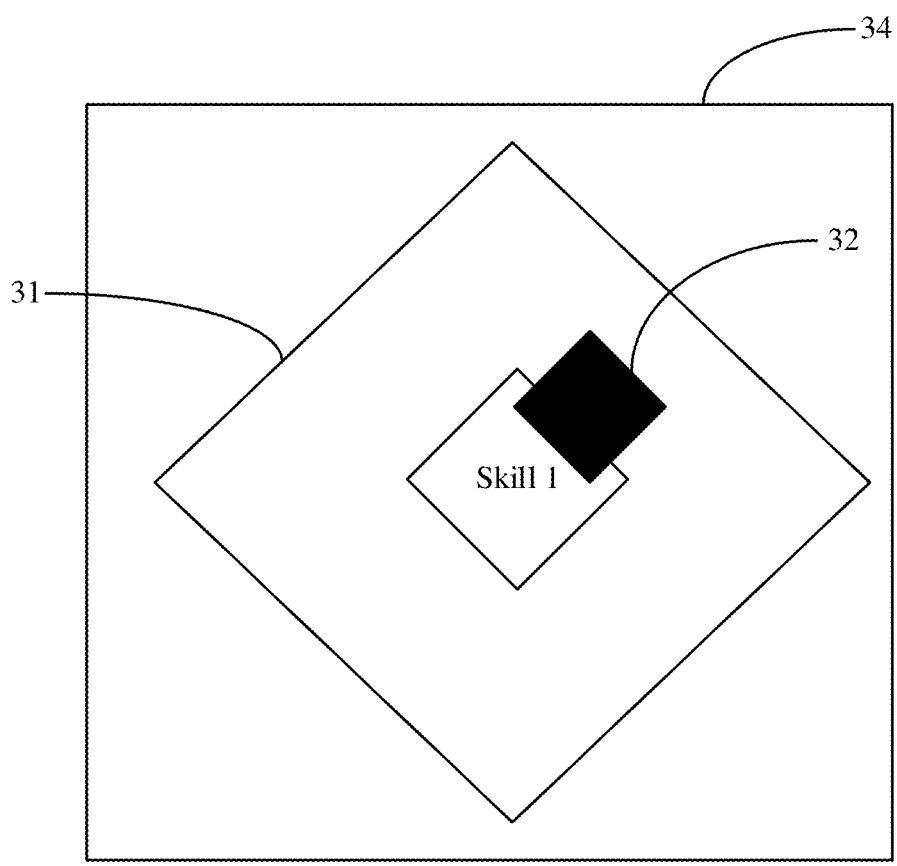
FIG. 6 is a schematic diagram of a skill operation area according to an example embodiment.

Referring to FIG. 6, in a skill operation area 34 of the graphic user interface, a skill release trigger operation on the skill object 1 is obtained, and the skill release auxiliary control object is obtained through rendering. The skill release auxiliary control object includes a skill release control aperture object 31 and a virtual joystick object 32. A skill release control operation is subsequently triggered, so that a location of the skill release control aperture object 31 remains unchanged.

For example, when it is detected that the virtual joystick object 32 moves with dragging of a gesture of the skill release operation, the virtual joystick object 32 deviates from a center of the skill release control aperture object 31, and the skill release control operation is triggered, so that the location of the skill release control aperture object remains unchanged.

When the user presses the skill object 1 ("skill 1"), the terminal triggers to generate the object selection instruction, and then the user may drag the virtual joystick object 32 to move in the skill release control aperture object 31, to adjust the skill release location of the skill object and re-generate the object selection instruction. That is, in the object selection method in an example embodiment of the disclosure, triggering may be performed by dragging the virtual joystick object 32. However, the objet selection method in the disclosure is not limited thereto.

The skill release control aperture object 31 may have a wheel disc shape, a rectangular shape, or a triangle shape. The specific shape may be set depending on embodiments or actual requirements. The virtual joystick object 32 may have a ring shape, a square shape, or a ring shape and may be referred to as a joystick. In actual application, to facilitate operations, shapes of the skill release control aperture object 31 and the virtual joystick object 32 may be consistent.

In an embodiment, in a mode of automatically triggering the object selection instruction, the terminal may automatically trigger the object selection instruction in real time. For example, the object selection instruction is automatically triggered to be generated at an interval of time.

In actual application, to facilitate a user operation, improve output efficiency of an interaction result, and reduce resources, a sustained release mode (corresponding to a mode of automatically triggering an instruction) may be set for skill release. In the sustained release mode, the terminal may automatically trigger to generate the object selection instruction without requiring a user operation. That is, the operation of "determining, in the at least one virtual object according to an object selection instruction, a candidate virtual object to which a skill is released" may include the following operations:

automatically triggering generating the object selection instruction in a case that skill release is in a sustained release mode;

determining, in the at least one virtual object according to the object selection instruction, the candidate virtual object to which a skill is released.

In an embodiment, when skill release is in the sustained release mode, after the target virtual object to which a skill is released is selected, when the skill release confirmation operation of the skill object is detected, a skill release operation of the skill object is performed on the target virtual object.

Figure 7:
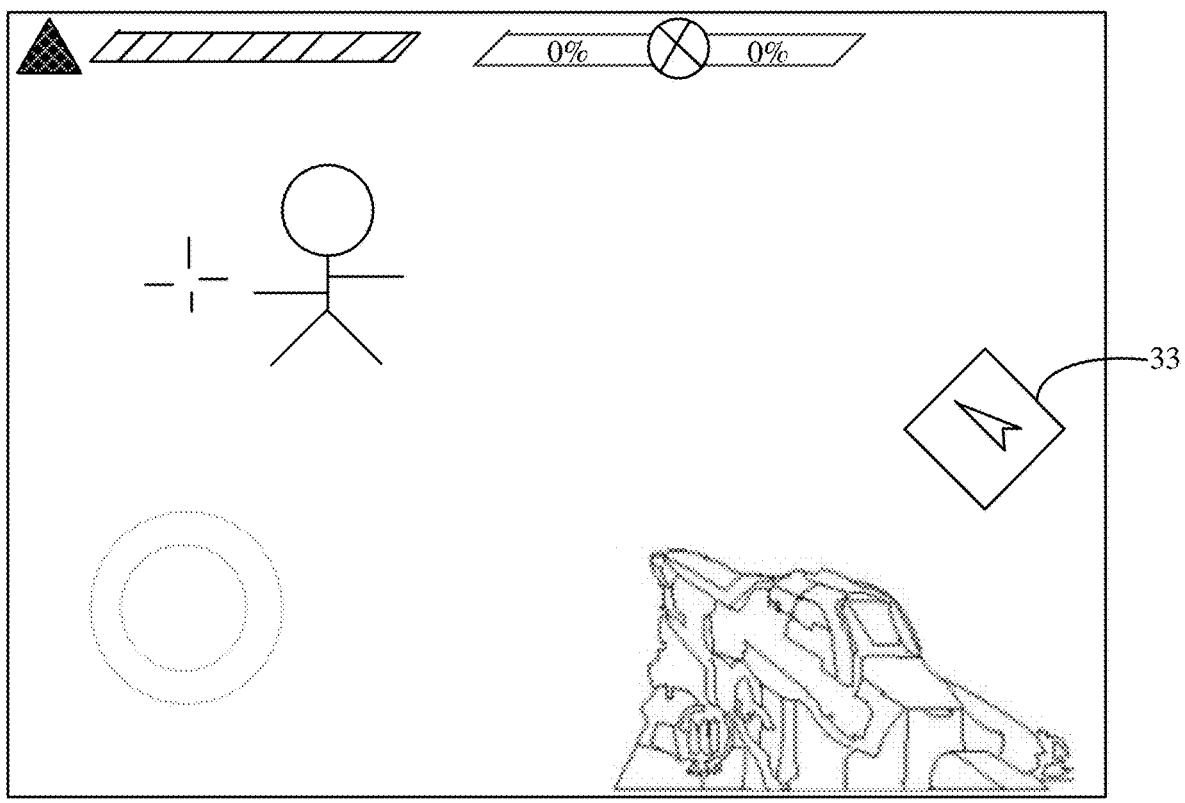
FIG. 7 is a schematic diagram of a second game interface according to an example embodiment.

In an embodiment, the skill release trigger operation may further include: clicking the skill object. For example, referring to FIG. 7, when skill release is in the sustained release mode, that is, in a sustained trigger mode, when the user clicks a skill key 33, the object selection instruction may be triggered to be generated to trigger selection of the object to which a skill is released. In this case, a skill release speed is improved, to improve an output speed of the interaction result.

203: Obtain a deviation parameter of the candidate virtual object in the candidate object set relative to a reference object.

The reference object may be a virtual object in the graphic user interface and may be set according to actual requirements or arbitrarily set, such as a selected object in a background or a user role object representing the user.

The candidate virtual object may also be a camera component. In this case, a deviation parameter of the candidate virtual object in the graphic user interface relative to the reference object may be obtained.

The deviation parameter is deviation information of the candidate virtual object, such as a virtual character object, relative to the reference object. The deviation parameter may include at least one of a deviation angle and a deviation distance. In other embodiments, the deviation parameter may further include a deviation direction and the like.

Figure 8:
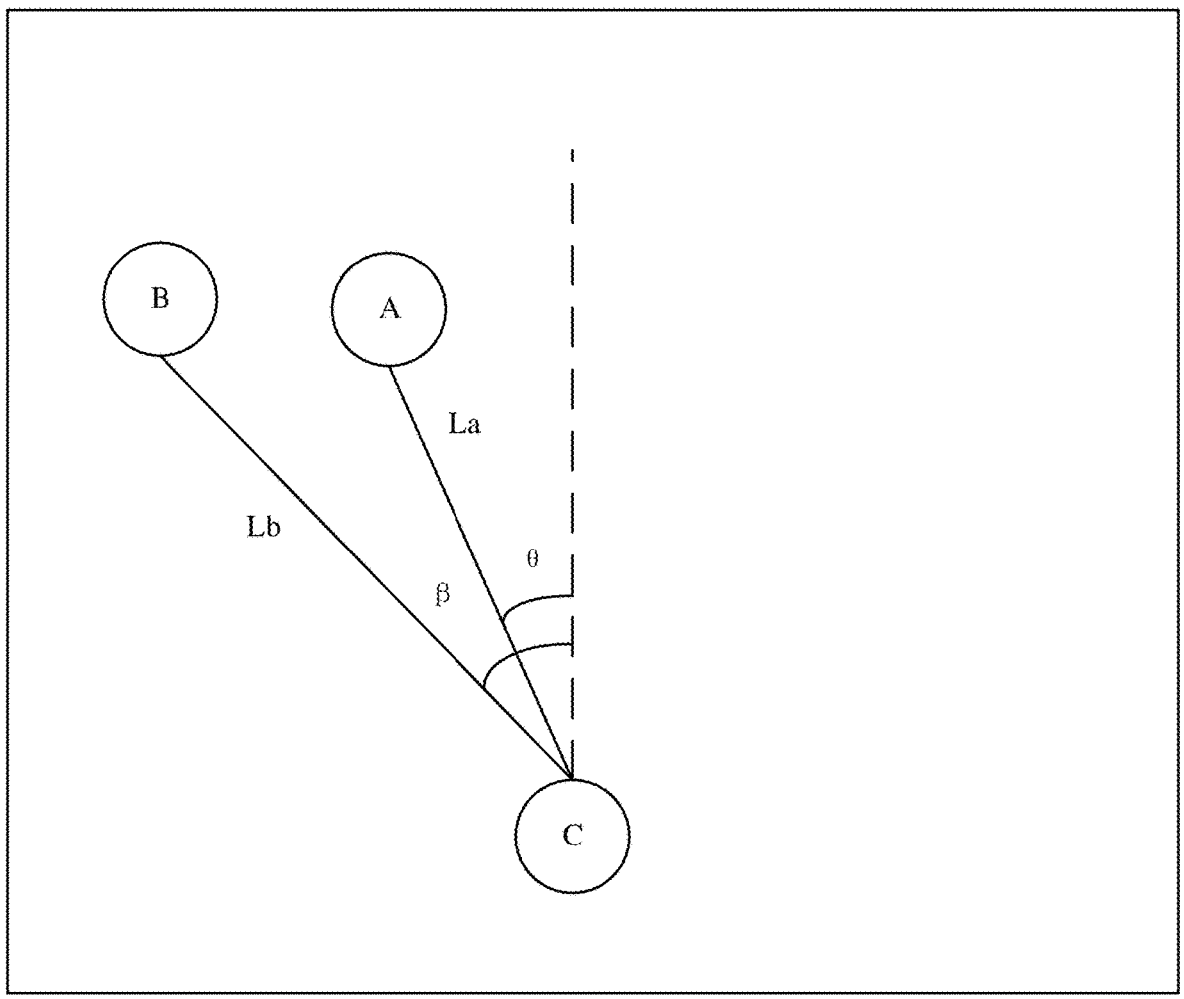
FIG. 8 is a schematic diagram of a deviation parameter according to an example embodiment.

The deviation angle is a deviation angle of the candidate virtual object in a preset panel or a three-dimensional scene picture relative to the reference object. The preset panel may include a screen on which the graphic user interface is located. For example, referring to FIG. 8, in the graphic user interface, a target point A representing a virtual object a, a target point B representing a virtual object b, and a target point C representing a reference object c may be included. A deviation angle of the target point A relative to the target point C is $\theta$, and a deviation angle of the target point B relative to the target point C is $\theta+\beta$.

The deviation distance may be a deviation distance of the candidate virtual object in the preset panel or the three-dimensional scene picture relative to the reference object, that is, a distance between the candidate virtual object and the reference object in the preset panel or the three-dimensional scene picture. The preset panel may include a screen on which the graphic user interface is located. For example, referring to FIG. 8, in the graphic user interface, a target point A representing a virtual object a, a target point B representing a virtual object b, and a target point C representing a reference object c may be included. A deviation distance of the target point A relative to the target point C is La, and a deviation distance of the target point B relative to the target point C is Lb.

204: Select, from the candidate object set according to the deviation parameter, a target virtual object to which a skill is released.

For example, the target virtual object to which a skill is released may be selected from the candidate object set according to the deviation parameter of each candidate virtual object in the candidate object set relative to the reference object.

There may be one or more target virtual objects to which a skill is released, and the target virtual objects may be specifically configured according to actual requirements.

In an embodiment, the target virtual object to which a skill is released may be selected from the candidate object set based on a value of the deviation parameter. For example, a candidate virtual object having a largest deviation angle and/or a smallest deviation distance relative to the reference object is selected as the target virtual object.

In an embodiment, after the target virtual object is selected, a currently selected target virtual object may be prompted in the graphic user interface. For example, a selected identifier may be displayed on the target virtual object, to give notification to the user that the target virtual object is currently selected. The selected identifier may include a selection box, a color identifier, and the like.

Figure 9:
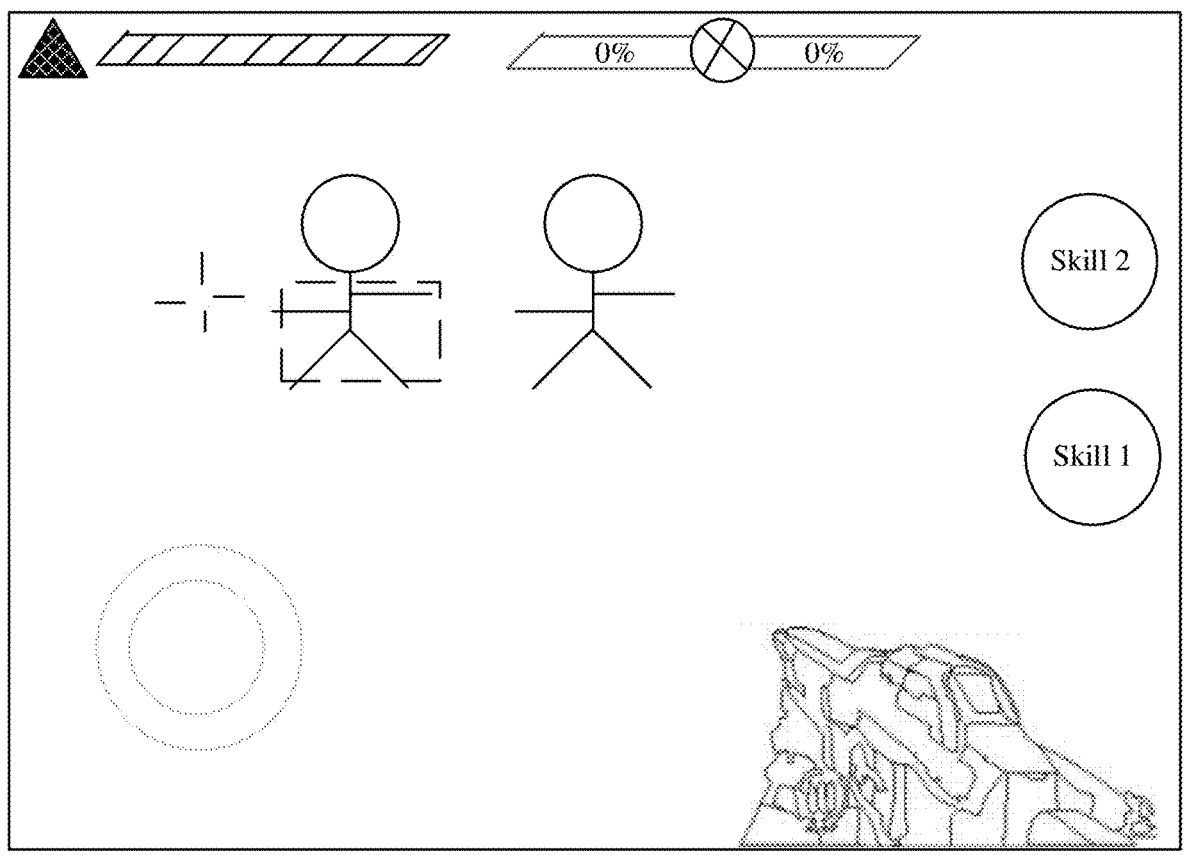
FIG. 9 is a schematic diagram of a third game interface according to an example embodiment.

For example, using an example in which the graphic user interface is an FPS game interface, referring to FIG. 9, when a release object of the skill object is selected as a left virtual character object by using the object selection method in an example embodiment, a selected box (in dotted line) is displayed on the left virtual character object, to give notification to the user.

Optionally, in this implementation method according to an example embodiment, different object selection manners may be used based on a quantity of objects included in the candidate object set. As follows:

(1) The Candidate Object Set Includes at Least Two Candidate Virtual Objects.

In this case, one or at least two target virtual objects to which a skill is released may be selected from the candidate object set according to the deviation parameter of each candidate virtual object in the candidate object set relative to the reference object.

Specifically, in an embodiment, to improve object selection accuracy and accuracy of the interaction result, a selection weight of the candidate virtual object may be set based on the deviation parameter of the candidate virtual object, and then the one or at least two target virtual objects to which a skill is released is selected from the candidate object set according to the selection weight of the candidate virtual object. That is, the operation of "selecting, from the candidate object set according to the deviation parameter, a target virtual object to which a skill is released" may include the following operations:

obtaining a selection weight of each candidate virtual object in the candidate object set according to the deviation parameter, to obtain the selection weight of each candidate virtual object in the candidate object set; and selecting, from the candidate object set according to the selection weight of each candidate virtual object in the candidate object set, a target virtual object or at least two target virtual objects.

The selection weight of the candidate virtual object may indicate a probability of the virtual object being an object to which a skill is released, such as 30%.

In an example embodiment, the selection weight of the candidate virtual object may be set in a manner such that a larger deviation parameter indicates a smaller selection weight. For example, in an embodiment, when the deviation parameter includes the deviation angle, the selection weight of the candidate virtual object may be set according to a rule that a larger deviation angle indicates a smaller selection weight, and a smaller deviation angle indicates a larger selection weight. For example, referring to FIG. 8, a deviation angle of the virtual object a is smaller than a deviation angle of the virtual object b. Therefore, a selection weight of the virtual object a is higher than a selection weight of the virtual object b.

For another example, in an embodiment, when the deviation parameter includes the deviation distance, the selection weight of the candidate virtual object may be set according to a rule that a larger deviation distance indicates a smaller selection weight, and a smaller deviation distance indicates a larger selection weight. For example, referring to FIG. 8, a deviation distance of the virtual object a is smaller than a deviation distance of the virtual object b. Therefore, a selection weight of the virtual object a is higher than a selection weight of the virtual object b.

In an embodiment, when the deviation parameter includes the deviation angle and the deviation distance, a weight reference parameter of the candidate virtual object may be obtained according to the deviation angle and the deviation distance of the candidate virtual object, and then a selection weight of the candidate virtual object is set based on the weight reference parameter. The weight reference parameter is used to indicate a parameter obtained or set by the selection weight. The parameter may be a self-defined parameter. The weight reference parameter is set through the deviation angle and the deviation distance, to improve weight setting accuracy of the object, thereby improving object selection accuracy.

There may be a plurality of manners of obtaining the weight reference parameter. For example, a weighted sum of the deviation angle and the deviation distance may be calculated, and the weighted sum is used as the weight reference parameter. For example, referring to FIG. 8, the deviation angle of the target point A relative to the target point C is $\theta$, and the deviation distance is La. In this case, a weight reference parameter of a candidate virtual object A is $QA=\theta \times p1 + La \times p2$, p1 is a weight value of the deviation angle, and p2 is a weight value of the deviation distance.

After the weight reference parameter is obtained, the selection weight of the candidate virtual object may be set based on a rule that a larger weight reference parameter indicates a smaller selection weight, and a smaller weight reference parameter indicates a larger selection weight.

In an embodiment, when a target virtual object is configured and selected, after a selection weight of each candidate virtual object is obtained, a candidate virtual object with a highest selection weight may be selected as the target virtual object to which a skill is released. Alternatively, to improve flexibility of object selection, a candidate virtual object with a selection weight that is between the highest selection weight and a lowest selection weight may be selected as the target virtual object to which a skill is released.

Figure 10:
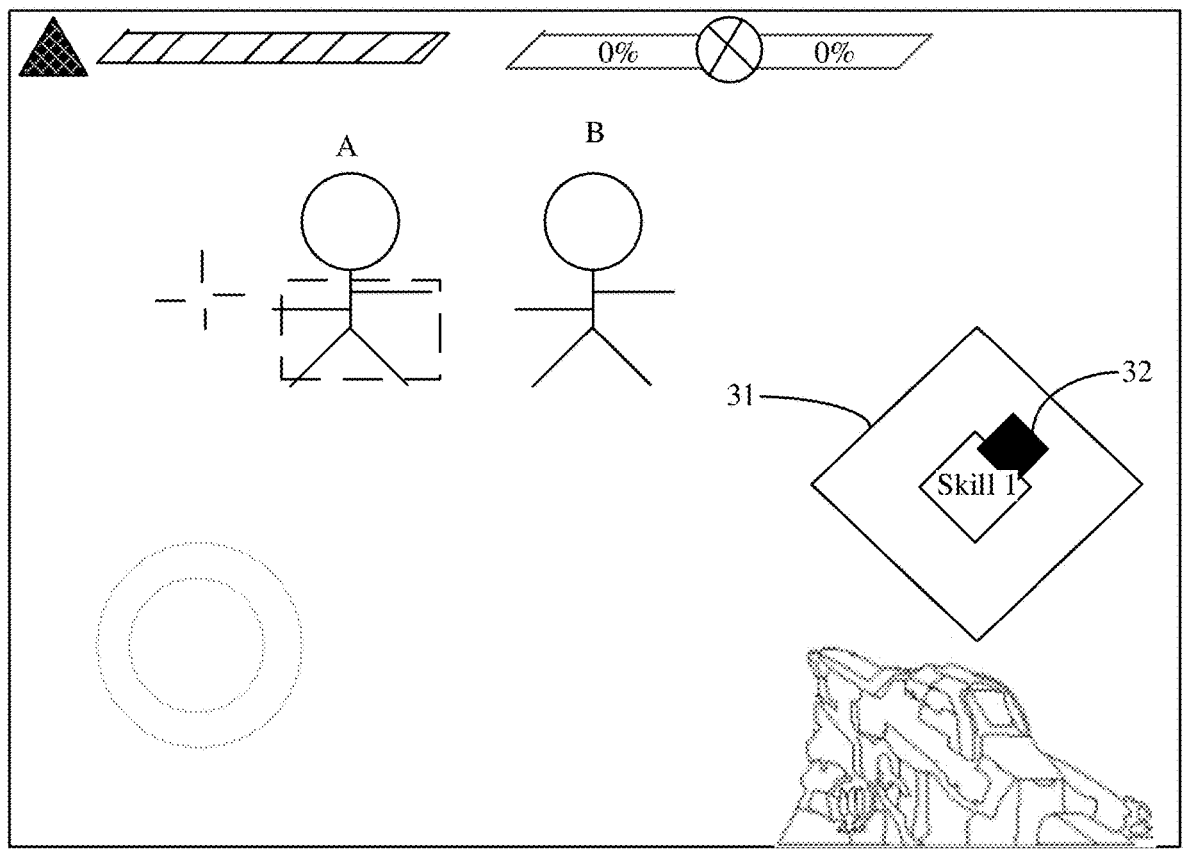
FIG. 10 is a schematic diagram of a fourth game interface according to an example embodiment.

For example, referring to FIG. 10, using an example in which the graphic user interface is an FPS game interface, assuming that the game interface includes virtual objects A and B, when the user presses an upper right skill key, the object selection instruction is triggered to be generated, and a skill release control aperture object 31 and a virtual joystick object 32 are simultaneously displayed at a predetermined location. In this case, the terminal may determine, according to the object selection instruction, that the virtual objects A and B are candidate virtual objects to which a skill is released. Then, the terminal obtains deviation parameters (such as a deviation angle and/or deviation record) of the objects A and B relative to the reference object (such as a game camera). The terminal calculates, according to the deviation parameters of the objects A and B, the selection weight of the object A to be 0.7 and the selection weight of the object B to be 0.3. In this case, the candidate virtual object A may be selected as the target virtual object to which a skill is released, a selected box is displayed on the virtual object A of the game interface.

Figure 11:
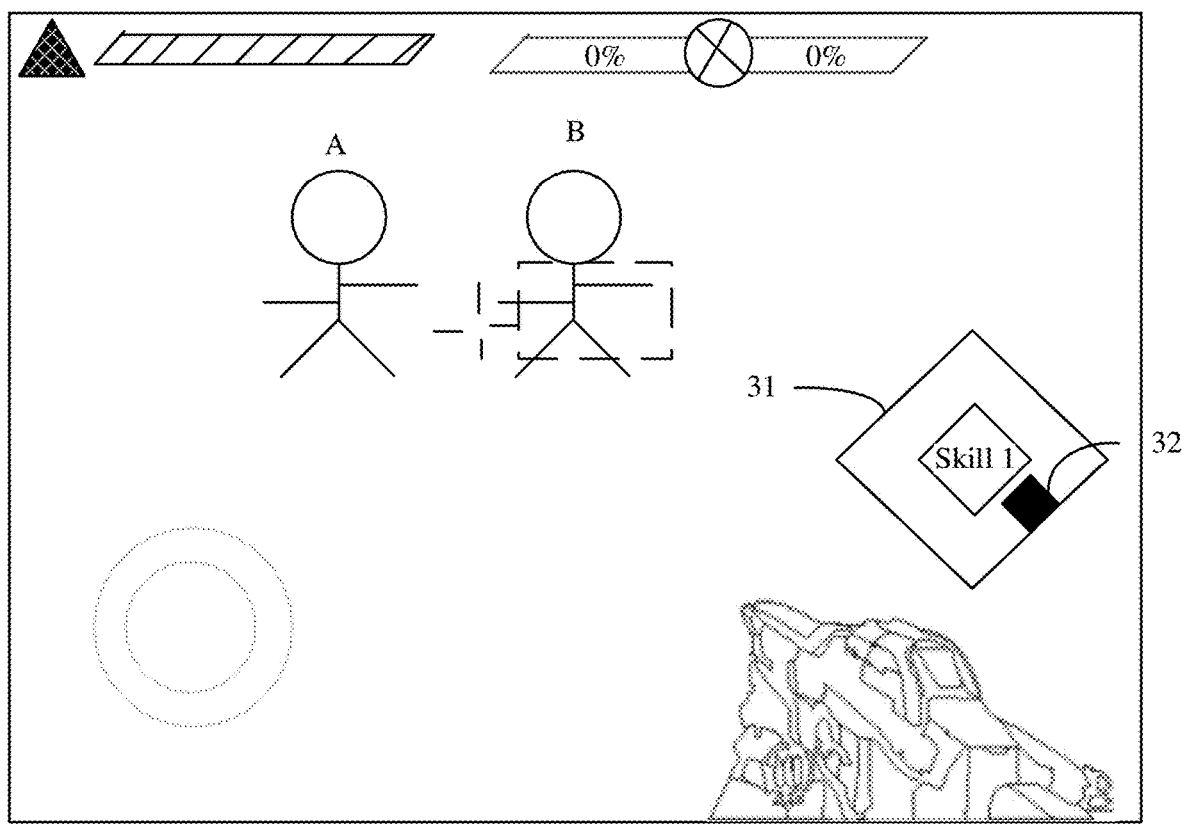
FIG. 11 is a schematic diagram of a fifth game interface according to an example embodiment.

Referring to FIG. 11, when the user drags the virtual joystick object 32, for example, drags to the lower right of the skill release control aperture object 31, the skill release location is correspondingly adjusted in a game user interface. Because the skill release location is related to the game camera, in actual application, deviation or movement of the game camera may be adjusted according to the drag operation on the virtual joystick object 32. In this case, the skill release location changes. An identifier, such as a sight of a gun, may be set in the game interface to represent the skill release location. Therefore, when the game camera changes, the sight of the gun in the game interface also changes.

Referring to FIG. 11, when the skill release location changes, the terminal re-obtains deviation parameters (such as the deviation angle and/or deviation distance) of the objects A and B relative to the reference object (such as the game camera). The terminal calculates, according to the deviation parameters of the objects A and B, a selection weight of the object A to be 0.4, and a selection weight of the object B to be 0.6. Therefore, in this case, the candidate virtual object B is selected as the target virtual object to which a skill is released, and the selected box is displayed on the virtual object B of the game interface.

Figure 12:
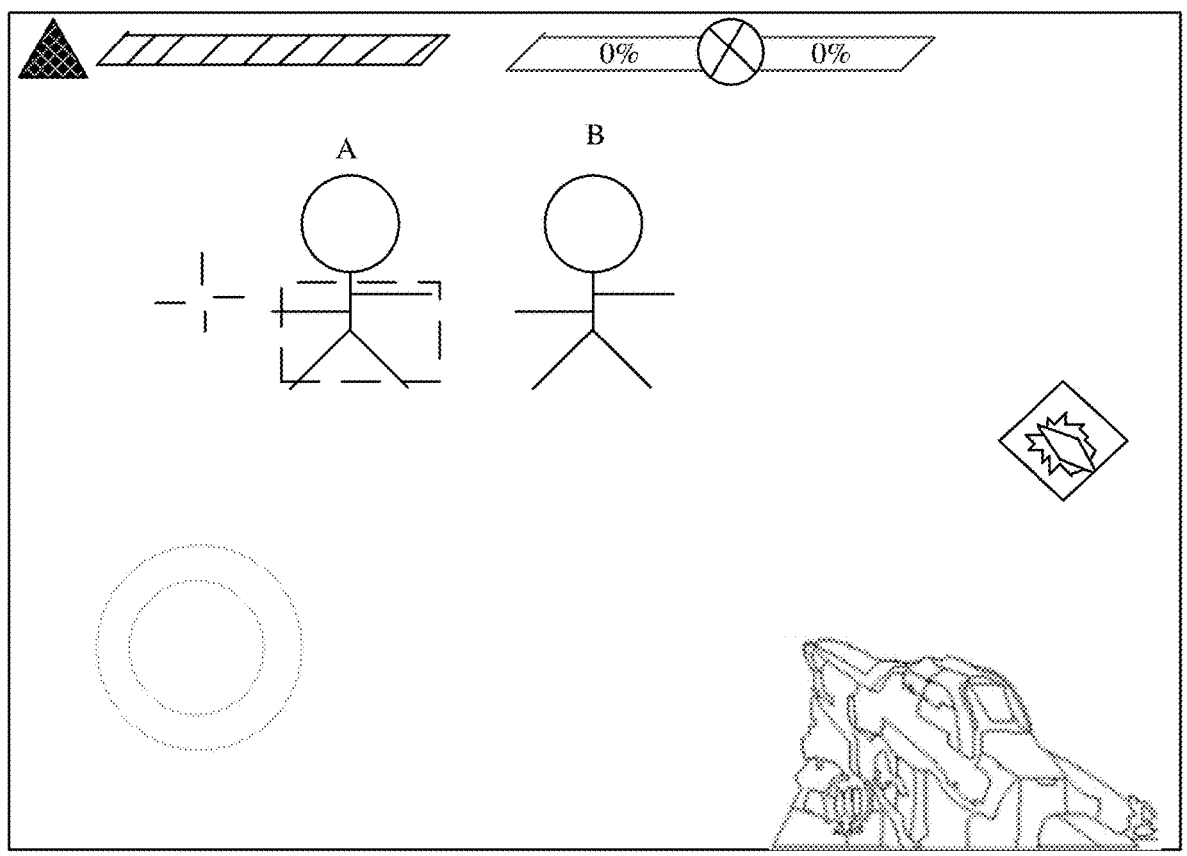
FIG. 12 is a schematic diagram of a sixth game interface according to an example embodiment.

For another example, referring to FIG. 12, using an example in which the graphic user interface is an FPS game interface, assuming that the game interface includes virtual objects A and B, in a sustained trigger selection mode, when the user clicks the right skill key, the object selection instruction is triggered to be generated. In this case, the terminal may determine, according to the object selection instruction, that the virtual objects A and B are candidate virtual objects to which a skill is released. Then, the terminal obtains deviation parameters (such as a deviation angle and/or deviation distance) of the objects A and B relative to the reference object (such as a game camera). The terminal calculates, according to the deviation parameters of the objects A and B, the selection weight of the object A to be 0.9 and the selection weight of the object B to be 0.1. In this case, the candidate virtual object A may be selected as the target virtual object to which a skill is released, and a selected box is displayed on the virtual object A of the game interface.

In an embodiment, when a plurality of target virtual objects is configured and selected, after the selection weight of each candidate virtual object is obtained, several first candidate virtual objects with highest selection weights may be selected as target virtual objects to which a skill is released.

Figure 13:
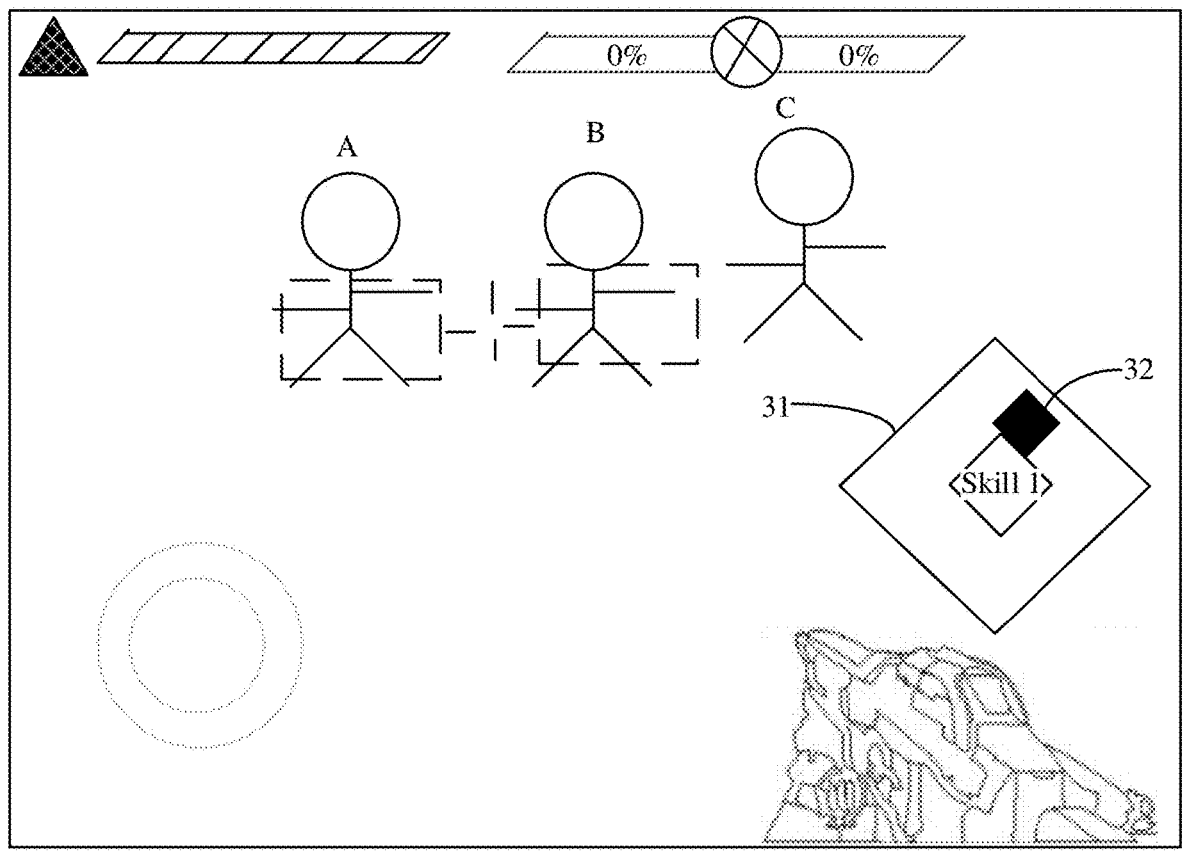
FIG. 13 is a schematic diagram of a seventh game interface according to an example embodiment.

For example, referring to FIG. 13, using an example in which the graphic user interface is an FPS game interface, assuming that the game interface includes virtual objects A, B, and C, when the user presses an upper right skill key, the object selection instruction is triggered to be generated, and a skill release control aperture object 31 and a virtual joystick object 32 are simultaneously displayed at a predetermined location. In this case, the terminal may determine, according to the object selection instruction, that the virtual objects A, B, and C are candidate virtual objects to which a skill is released. Then, the terminal obtains deviation parameters (such as a deviation angle and/or deviation distance) of the objects A, B, and C relative to the reference object (such as a game camera). The terminal calculates, according to the deviation parameters of the objects A, B, and C, the selection weight of the object A to be 0.5, the selection weight of the object B to be 0.3, and the selection weight of the object C to be 0.2. In this case, the candidate virtual objects A and B may be selected as the target virtual objects to which a skill is released, and a selected box is displayed on the virtual objects A and B of the game interface.

Figure 14:
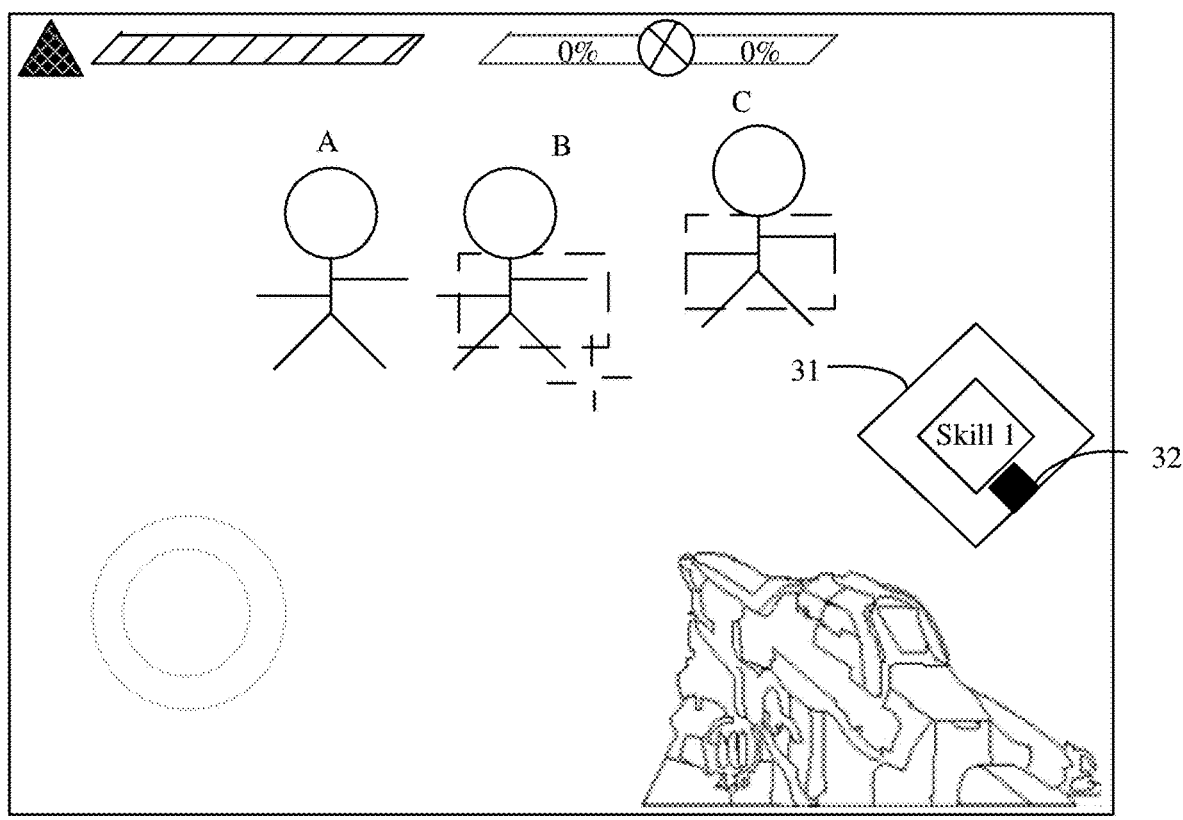
FIG. 14 is a schematic diagram of an eighth game interface according to an example embodiment.

Referring to FIG. 14, when the user drags the virtual joystick object 32, for example, drags to the lower right of the skill release control aperture object 31, the skill release location is correspondingly adjusted in a game user interface. When the skill release location changes, the terminal re-obtains deviation parameters (such as the deviation angle and/or deviation distance) of the objects A, B, and C relative to the reference object (such as the game camera). The terminal calculates, according to the deviation parameters of the objects A, B, and C, a selection weight of the object A to be 0.2, a selection weight of the object B to be 0.3, and a selection weight of the object C to be 0.5. Therefore, in this case, the candidate virtual objects B and C are selected as the target virtual objects to which a skill is released, and the selected box is displayed on the virtual objects B and C of the game interface.

(2) The Candidate Object Set Includes One Candidate Virtual Object.

In this case, to improve object selection accuracy, whether the deviation parameter of the candidate virtual object meets a preset condition may be determined, and the candidate virtual object is selected as the target virtual object to which a skill is released. That is, the operation of "selecting the candidate virtual object as the target virtual object to which a skill is released in a case that the deviation parameter meets the preset condition" may include the following operations:

determining whether the deviation parameter meets a preset condition; and selecting the candidate virtual object as the target virtual object to which a skill is released in a case that the deviation parameter meets the preset condition.

The preset condition may be configured according to user actual requirements. For example, when the deviation parameter includes the deviation angle, the preset condition may include: the deviation angle is less than a preset angle. That is, the operation of "determining whether a deviation parameter of the candidate virtual object relative to a reference object meets a preset condition" may include the following operation:

determining whether the deviation angle of the candidate virtual object is less than the preset angle; if yes, determining that the deviation parameter meets the preset condition; and if not, determining that the deviation parameter does not meet the preset condition.

For another example, when the deviation parameter includes the deviation distance, the preset condition may include: the deviation distance is less than the preset distance. That is, the operation of "determining whether a deviation parameter meets a preset condition" may include the following operation:

determining whether the deviation distance is less than the preset distance; if yes, determining that the deviation parameter meets the preset condition; and if not, determining that the deviation parameter does not meet the preset condition.

For another example, when the deviation parameter includes the deviation distance and the deviation angle, the preset condition may include: the deviation angle is within a preset angle range, and the deviation distance is within a preset distance range. In this case, the operation of "determining whether a deviation parameter meets a preset condition" may include the following operation:

determining that the deviation parameter meets the preset condition when the deviation angle is within the preset angle range, and the deviation distance is within the preset distance range.

The object to which a skill is released is determined by using a plurality of deviation parameters, to improve object selection accuracy, so that a selected object meets a user requirement, to improve human-machine interaction and accuracy of the interaction result.

The preset angle, the preset distance, the preset angle range, and the preset distance range may all be set according to actual requirements or arbitrarily set.

Figure 15:
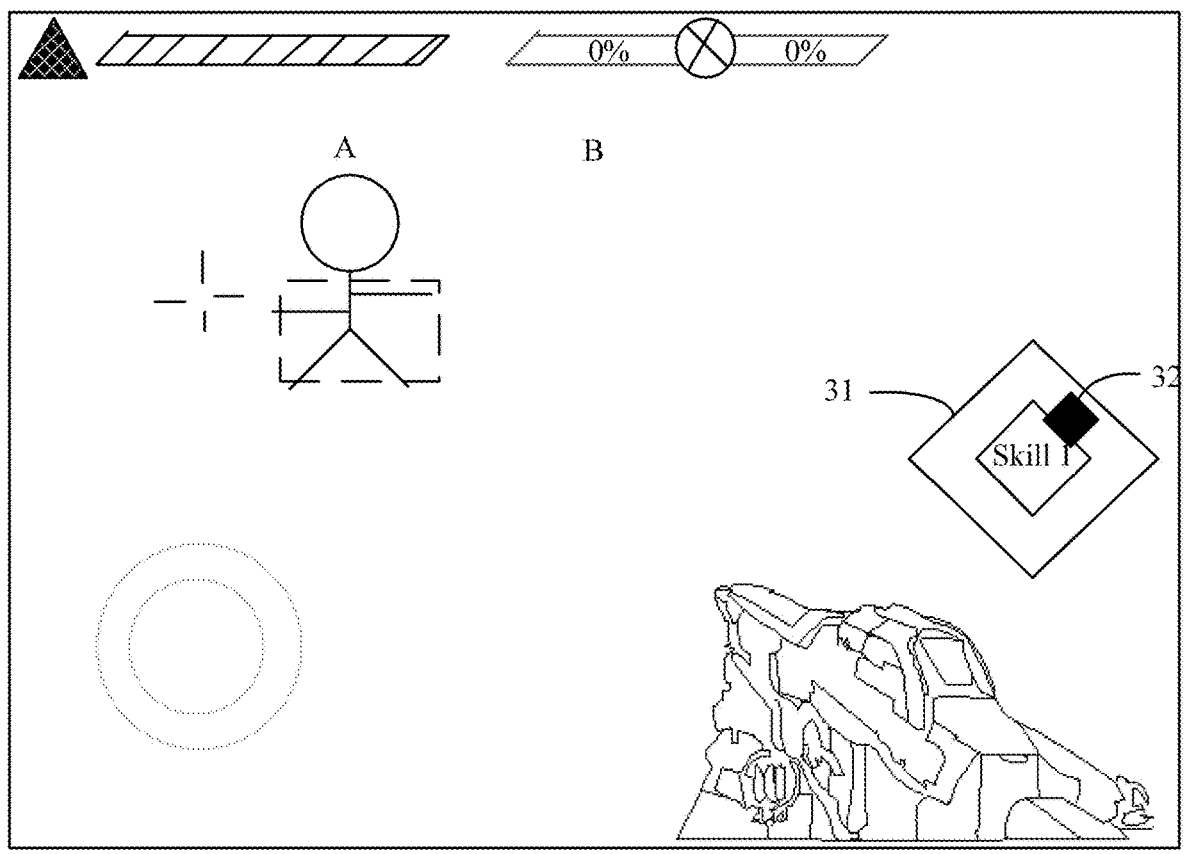
FIG. 15 is a schematic diagram of a ninth game interface according to an example embodiment.

For example, referring to FIG. 15, using an example in which the graphic user interface is an FPS game interface, when the user presses the right skill key, the object selection instruction is triggered to be generated, the skill release control aperture object 31 and the virtual joystick object 32 are simultaneously displayed at the predetermined location, and the terminal determines, according to the object selection instruction, that a visual field of the game camera only includes the virtual object A. Therefore, in this case, the candidate object set includes only the virtual object A. In this case, the terminal may obtain a deviation parameter (a deviation angle and/or deviation distance) of the virtual object A relative to a camera. When the deviation parameter meets the preset condition, the virtual object A may be selected as the target virtual object to which a skill is released, and the selected box is displayed on the virtual object A, to give notification to the user.

Figure 16:
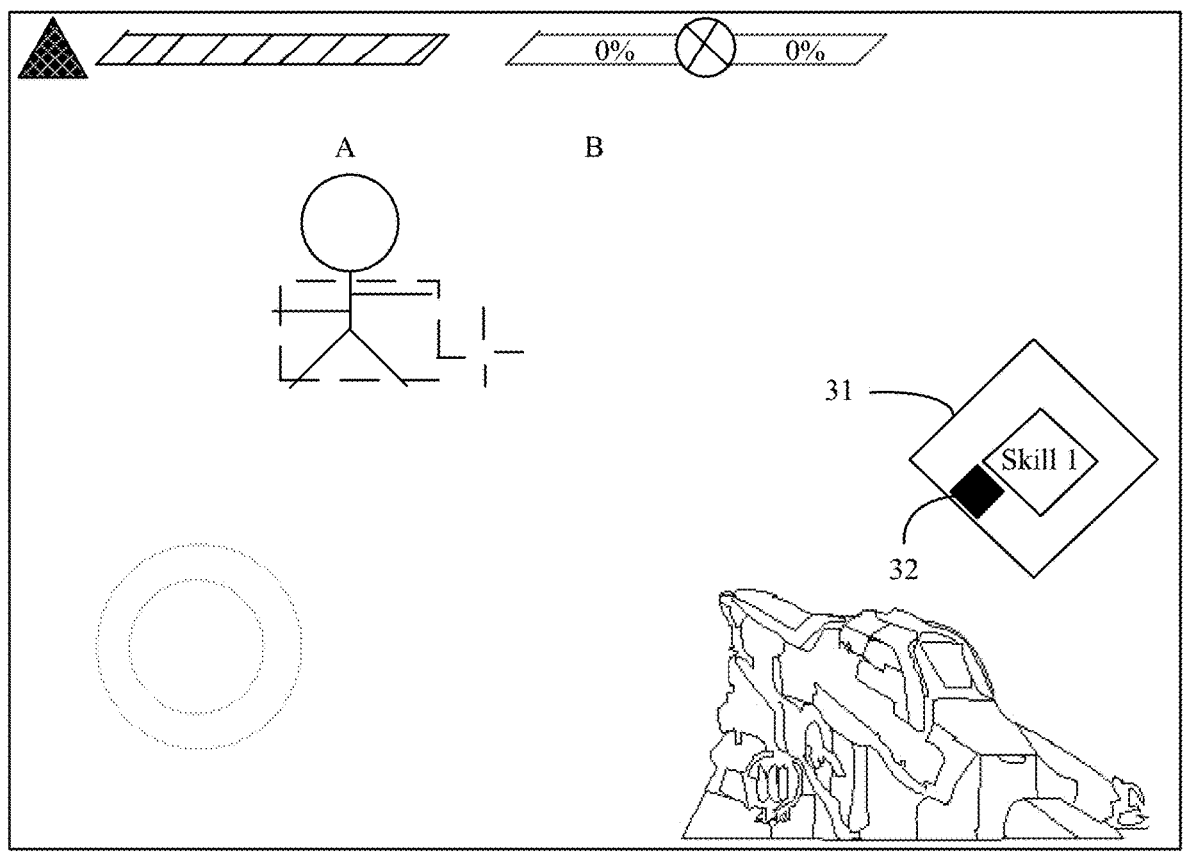
FIG. 16 is a schematic diagram of a tenth game interface according to an example embodiment.

Referring to FIG. 16, when the user drags the virtual joystick object 32, for example, drags to the left of the skill release control aperture object 31, the skill release location is correspondingly adjusted in a game user interface, and the object selection instruction is re-triggered. Because the skill release location is related to the game camera, in actual application, deviation or movement of the game camera may be adjusted according to the drag operation on the virtual joystick object 32. In this case, the skill release location changes. An identifier, such as a sight of a gun, may be set in the game interface to represent the skill release location. Therefore, when the game camera changes, the sight of the gun in the game interface also changes. In FIG. 16, when the skill release location changes, the terminal may determine, according to the object selection instruction, that a visual field of the game camera includes only the virtual object A. Therefore, in this case, the candidate object set includes only the virtual object A. In this case, the terminal re-obtains the deviation parameter (the deviation angle and/or deviation distance) of the virtual object A relative to the camera. When the deviation parameter also meets the preset condition, the virtual object A may be selected as the target virtual object to which a skill is released again, and the selected box is displayed on the virtual object A, to give notification to the user.

The object selection method provided in an example embodiment of the disclosure is described above. In an example embodiment, after the object to which a skill is released is selected, the skill release operation may also be performed on the target virtual object.

For example, when the skill release trigger operation of the skill object is detected, when the object selection instruction is triggered to be generated, when a skill release confirmation operation of the skill object is detected, the skill release operation of the skill object may be performed on the target virtual object.

There may be a plurality of skill release confirmation operations. For example, when a skill release auxiliary control object is displayed, the skill release confirmation operation may include a release operation of a drag operation of the virtual joystick object. That is, the skill release operation of the skill object is performed on the target virtual object in a case that a release operation of the drag operation is detected.

For example, referring to FIG. 10, FIG. 11, FIG. 12, and FIG. 15, when the release operation of the drag operation is detected, the skill release operation of the skill object is performed on the target virtual object.

It may be learned from the above that in an example embodiment of the disclosure, a graphic user interface is displayed, the graphic user interface including at least one virtual object; a candidate virtual object to which a skill is released is determined from the at least one virtual object according to an object selection instruction, to obtain a candidate object set; a deviation parameter of the candidate virtual object in the candidate object set relative to a reference object is obtained; and a target virtual object to which a skill is released is selected from the candidate object set according to the deviation parameter. In this solution, the target virtual object to which a skill is released may be selected based on the deviation parameter of the virtual object relative to the reference object, the user can quickly and accurately determine the object to which a skill is released without performing an accurate skill release operation, thereby improving accuracy of an interaction result and reducing resources of the terminal.

In addition, in an object selection process, when the skill release trigger operation of the skill object in the skill operation area is detected, the skill release auxiliary control object may be displayed at the preset location on the graphic user interface. The skill release auxiliary control object can appear at a default fixed location, namely, the preset location, to promote fast response of the user in an information interaction process and avoid response time cost by the user in searching for the graphic user interface. When the drag operation on the virtual joystick object is detected, the skill release location of the skill object is correspondingly adjusted in the graphic user interface, so that even if the virtual joystick object deviates from a center of the skill release control aperture object, a location of the skill release control aperture object is always unchanged. Because the location of the skill release control aperture object is unchanged, a control area is stable, to help user fast position a skill release range. When the release operation of the drag operation is detected, the skill release operation is performed on the skill object, so that the skill release operation can be accurately performed on the skill object in the skill release range according to a release direction and/or direction of the skill object obtained by moving the virtual joystick object along with dragging of a gesture of the skill release operation, to prevent a large quantity of mis-operations (or erroneous or unintended operations) from occurring, thereby improving interaction processing precision and accuracy.

In an embodiment, further detailed descriptions are provided according to the method described above.

In an example embodiment of the disclosure, an example in which the graphic user interface is an FPS game interface, and the virtual object is a virtual character object is used to further describe the object selection method in the disclosure.

Figure 17:
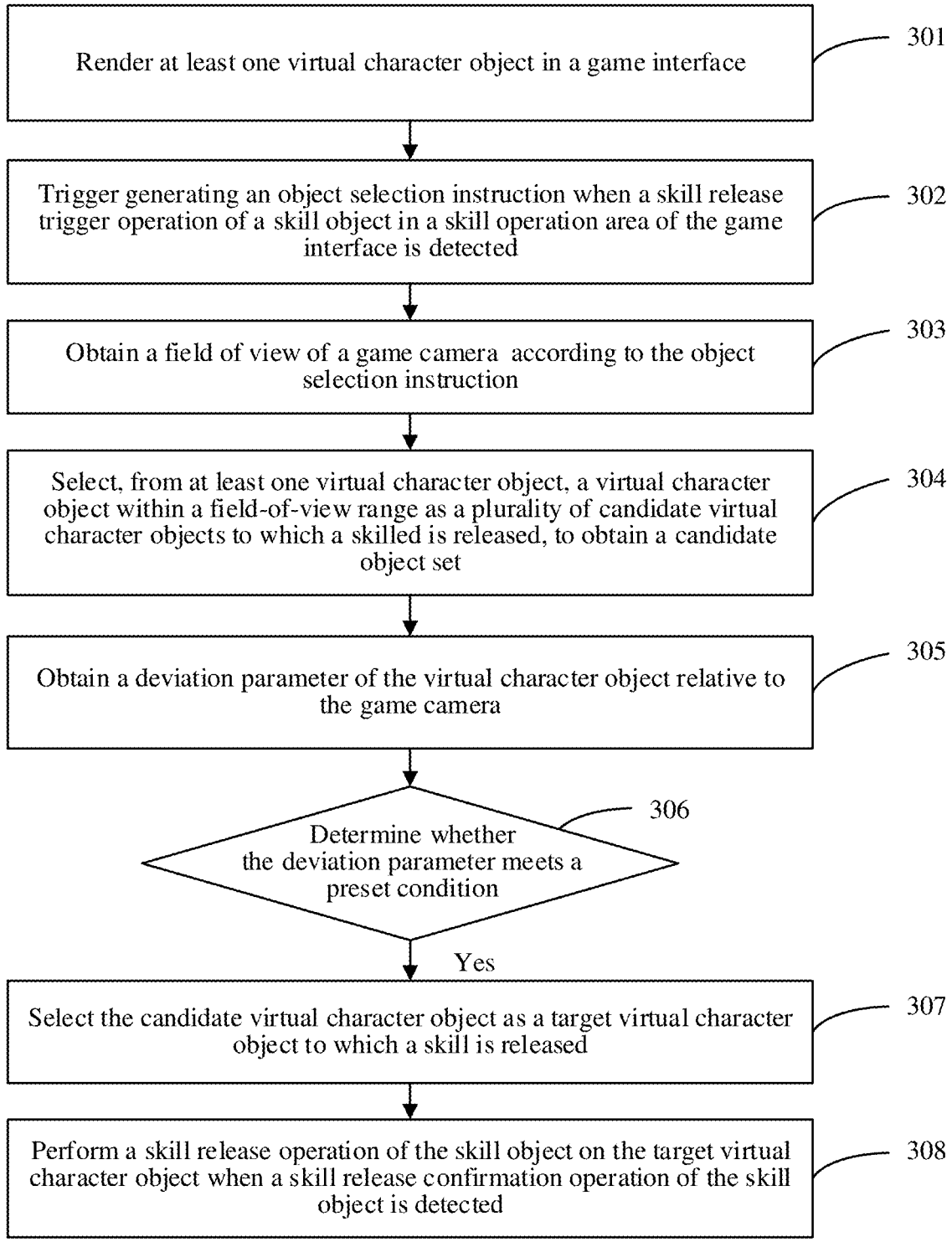
FIG. 17 is another schematic flowchart of an object selection method according to an example embodiment.

As shown in FIG. 17, an object selection method is provided, and a specific process is as follows:

301: Render at least one virtual character object in a game interface.

The game interface includes a two-dimensional game picture or a three-dimensional game picture.

The virtual character object is a user role object representing a player user or a role object representing a robot.

302: Trigger generating an object selection instruction when a skill release trigger operation of a skill object in a skill operation area of the game interface is detected.

The skill object may be an object representing a skill in the graphic user interface, such as a skill key.

There may be a plurality of skill release trigger operations, such as pressing, clicking, and sliding the skill object.

Optionally, to accurately perform the skill release operation on the skill object, to prevent a large quantity of mis-operations (or erroneous or unintended operations) from occurring, thereby improving interaction processing precision and accuracy, when the skill release trigger operation of the skill object is detected, the skill release auxiliary control object may be displayed at the preset location on the game interface, and the object selection instruction is triggered to be generated. The skill release auxiliary control object includes a skill release control aperture object and a virtual joystick object located within a radiation range of the skill release control aperture object.

In a case that a drag operation on the virtual joystick object is detected, the skill release location of the skill object is controlled to be correspondingly adjusted in the graphic user interface, and the object selection instruction is re-triggered, so that the target virtual character object is selected again.

Referring to FIG. 6, in a skill operation area 34 of the graphic user interface, a skill release trigger operation on the skill object 1 is obtained, and the skill release auxiliary control object is obtained through rendering. The skill release auxiliary control object includes the skill release control aperture object 31 and the virtual joystick object 32. A skill release control operation is subsequently triggered, so that a location of the skill release control aperture object 31 remains unchanged.

For example, when it is detected that the virtual joystick object 32 moves with dragging of a gesture of the skill release operation, the virtual joystick object 32 deviates from a center of the skill release control aperture object 31, and the skill release control operation is triggered, so that the location of the skill release control aperture object remains unchanged.

When the user presses the skill object 1, the terminal triggers to generate the object selection instruction, and then the user may drag the virtual joystick object 32 to move in the skill release control aperture object 31, to adjust the skill release location of the skill object and re-generate the object selection instruction. That is, in the object selection method in an example embodiment of the disclosure, triggering of generation of the object selection instruction may be performed by dragging the virtual joystick object 32.

303: Obtain a field of view of a game camera according to the object selection instruction.

The game camera is a component, that is, a camera component, which may be configured to render a corresponding scene picture in the game interface. The camera component may be a rendering component in unity, and the camera component may display a corresponding picture in the graphic user interface according to a configured height, width, and field of view.

The field of view of the camera component is also referred to as a field of view (FOV), and the camera component renders an angle range of the scene picture.

304: Select, from at least one virtual character object, a virtual character object within a field-of-view range as a candidate virtual character object to which a skill is released.

That is, a virtual character object outside a visual field is removed, and the candidate virtual character object to which a skill is released is determined in virtual character objects within the visual field.

305: Obtain, when there is one virtual character object, a deviation parameter of the virtual character object relative to the game camera.

The deviation parameter is deviation information of the virtual character object relative to the game camera. The deviation parameter may include at least one of a deviation angle and a deviation distance. In other embodiments, the deviation parameter may further include a deviation direction, and the like.

The deviation parameter is deviation information of the candidate virtual character object, such as the virtual character object, relative to the reference object. The deviation parameter may include at least one of a deviation angle and a deviation distance. In other embodiments, the deviation parameter may further include a deviation direction, and the like.

The deviation angle is a deviation angle of the candidate virtual character object in a preset panel or a three-dimensional scene picture relative to the reference object. The preset panel may include a screen on which the graphic user interface is located. For example, referring to FIG. 8, in the graphic user interface, a target point A representing a virtual character object a, a target point B representing a virtual character object b, and a target point C representing a reference object c may be included. A deviation angle of the target point A relative to the target point C is θ, and a deviation angle of the target point B relative to the target point point C is θ+β.

The deviation distance may be a deviation distance of the candidate virtual character object in the preset panel or the three-dimensional scene picture relative to the reference object, that is, a distance between the candidate virtual character object and the reference object in the preset panel or the three-dimensional scene picture. The preset panel may include a screen on which the graphic user interface is located. For example, referring to FIG. 8, in the graphic user interface, a target point A representing a virtual character object a, a target point B representing a virtual character object b, and a target point C representing a reference object c may be included. A deviation distance of the target point A relative to the target point C is La, and a deviation distance of the target point B relative to the target point C is Lb.

306: Determine whether the deviation parameter meets a preset condition; if yes, perform operation 307.

The preset condition may be configured according to user actual requirements. For example, when the deviation parameter includes the deviation angle, the preset condition may include: the deviation angle is less than a preset angle. That is, the operation of "determining whether a deviation parameter of the candidate virtual character object relative to a reference object meets a preset condition" may include the following operation:

determining whether the deviation angle of the candidate virtual character object is less than the preset angle; if yes, determining that the deviation parameter meets the preset condition; and if not, determining that the deviation parameter does not meet the preset condition.

For another example, when the deviation parameter includes the deviation distance, the preset condition may include: the deviation distance is less than the preset distance. That is, the operation of "determining whether a deviation parameter meets a preset condition" may include the following operation:

determining whether the deviation distance is less than the preset distance; if yes, determining that the deviation parameter meets the preset condition; and if not, determining that the deviation parameter does not meet the preset condition.

For another example, when the deviation parameter includes the deviation distance and the deviation angle, the preset condition may include: the deviation angle is within a preset angle range, and the deviation distance is within a preset distance range. In this case, the operation of "determining whether a deviation parameter meets a preset condition" may include the following operation:

determining that the deviation parameter meets the preset condition when the deviation angle is within the preset angle range, and the deviation distance is within the preset distance range.

The preset angle, the preset distance, the preset angle range, and the preset distance range may all be set according to actual requirements or arbitrarily set.

For example, referring to FIG. 15 and FIG. 16, when the user presses the right skill key, the object selection instruction is triggered to be generated, the skill release control aperture object 31 and the virtual joystick object 32 are simultaneously displayed at the predetermined location, and the terminal determines, according to the object selection instruction, that a visual field of the game camera only includes the virtual character object A. Therefore, in this case, the candidate object set includes only the virtual character object A. In this case, the terminal may obtain a deviation parameter (a deviation angle and/or deviation distance) of the virtual character object A relative to a camera. When the deviation parameter meets the preset condition, the virtual character object A may be selected as the target virtual character object to which a skill is released, and the selected box is displayed on the virtual character object A, to give notification to the user.

307: Select the candidate virtual character object as a target virtual character object to which a skill is released.

Optionally, a selection box may be displayed on the target virtual character object, to give notification to the user.

308: Perform a skill release operation of the skill object on the target virtual character object when a skill release confirmation operation of the skill object is detected.

There may be a plurality of skill release confirmation operations. For example, when a skill release auxiliary control object is displayed, the skill release confirmation operation may include a release operation of a drag operation of the virtual joystick object. That is, the skill release operation of the skill object is performed on the target virtual character object in a case that a release operation of the drag operation is detected.

For example, referring to FIG. 15 and FIG. 16, when the release operation of the drag operation is detected, the skill release operation of the skill object is performed on the target virtual character object.

It may be learned from the above that in an example embodiment of the disclosure, at least one virtual character object is rendered in a game interface, one candidate virtual character object to which a skilled is released is determined in the at least one virtual character object according to an object selection instruction, a deviation parameter of the candidate virtual character object relative to a game camera is obtained, and a target virtual character object to which a skill is released is selected from a candidate object set according to the deviation parameter. In this solution, the target virtual character object to which a skill is released may be selected based on the deviation parameter of the virtual character object relative to the reference object, the user can quickly and accurately determine the object to which a skill is released without performing an accurate skill release operation, thereby improving accuracy of an interaction result and reducing resources of the terminal.

In an embodiment, further detailed descriptions are provided according to the method described above.

In an example embodiment of the disclosure, an example in which the graphic user interface is an FPS game interface, and the virtual object is a virtual character object is used to further describe the object selection method in the disclosure.

Figure 18:
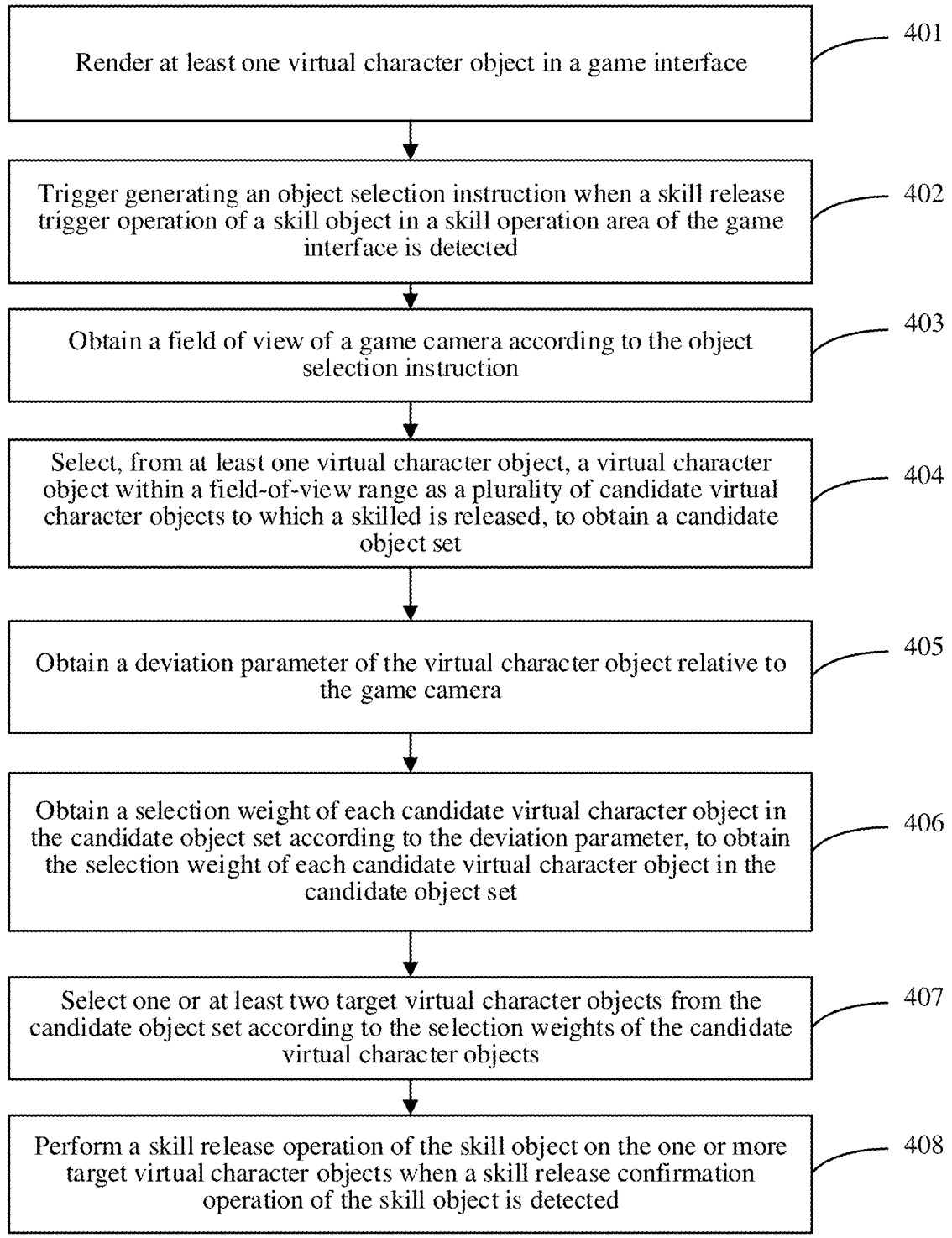
FIG. 18 is still another schematic flowchart of an object selection method according to an example embodiment.

As shown in FIG. 18, an object selection method according to an example embodiment is provided, including operations 401-408:

401: Render at least one virtual character object in a game interface.

The game interface includes a two-dimensional game picture or a three-dimensional game picture.

The virtual character object is a user role object representing a player user or a role object representing a robot.

402: Trigger generating an object selection instruction when a skill release trigger operation of a skill object in a skill operation area of the game interface is detected.

The skill object may be an object representing a skill in the graphic user interface, such as a skill key.

There may be a plurality of skill release trigger operations, such as pressing, clicking, and sliding the skill object.

Optionally, to accurately perform the skill release operation on the skill object, to prevent a large quantity of mis-operations (or erroneous or unintended operations) from occurring, thereby improving interaction processing precision and accuracy, when the skill release trigger operation of the skill object is detected, the skill release auxiliary control object may be displayed at the preset location on the game interface, and the object selection instruction is triggered to be generated based on the skill release auxiliary control object. The skill release auxiliary control object includes a skill release control aperture object and a virtual joystick object located within a radiation range of the skill release control aperture object.

In a case that a drag operation on the virtual joystick object is detected, the skill release location of the skill object is controlled to be correspondingly adjusted in the graphic user interface, and the object selection instruction is re-triggered, so that the target virtual character object is selected again.

Referring to FIG. 6, in a skill operation area 40 of the graphic user interface, a skill release trigger operation on the skill object 1 is obtained, and the skill release auxiliary control object is obtained through rendering. The skill release auxiliary control object includes a skill release control aperture object 31 and a virtual joystick object 32. A skill release control operation is subsequently triggered, so that a location of the skill release control aperture object 31 remains unchanged.

For example, when it is detected that the virtual joystick object 32 moves with dragging of a gesture of the skill release operation, the virtual joystick object 32 deviates from a center of the skill release control aperture object 31, and the skill release control operation is triggered, so that the location of the skill release control aperture object remains unchanged.

When the user presses the skill object 1, the terminal triggers to generate the object selection instruction, and then the user may drag the virtual joystick object 32 to move in the skill release control aperture object 31, to adjust the skill release location of the skill object and re-generate the object selection instruction. That is, in the object selection method in an example embodiment of the disclosure, triggering may be performed by dragging the virtual joystick object 32.

403: Obtain a field of view of a game camera according to the object selection instruction.

The game camera is a component, that is, a camera component, which may be configured to render a corresponding scene picture in the game interface. The camera component may be a rendering component in unity, and the camera component may display a corresponding picture in the graphic user interface according to a configured height, width, and field of view.

The field of view of the camera component is also referred to as a field of view (FOV), and the camera component renders an angle range of the scene picture.

404: Select, from at least one virtual character object, virtual character objects within a field-of-view range as a plurality of candidate virtual character objects to which a skill is released, to obtain a candidate object set.

That is, a virtual character object outside a visual field is removed, and the candidate virtual character objects to which a skilled is released are determined from the virtual character objects within the visual field.

The candidate object set includes at least two candidate virtual character objects.

405: Obtain a deviation parameter of the virtual character object relative to the game camera.

The deviation parameter is deviation information of the virtual character object relative to the game camera. The deviation parameter may include at least one of a deviation angle and a deviation distance. In other embodiments, the deviation parameter may further include a deviation direction, and the like.

The deviation parameter is deviation information of the candidate virtual character object, such as the virtual character object, relative to the reference object. The deviation parameter may include at least one of a deviation angle and a deviation distance. In other embodiments, the deviation parameter may further include a deviation direction, and the like.

The deviation angle is a deviation angle of the candidate virtual character object in a preset panel or a three-dimensional scene picture relative to the reference object. The preset panel may include a screen on which the graphic user interface is located. For example, referring to FIG. 8, in the graphic user interface, a target point A representing a virtual character object a, a target point B representing a virtual character object b, and a target point C representing a reference object c may be included. A deviation angle of the target point A relative to the target point C is $\theta$, and a deviation angle of the target point B relative to the target point C is $\theta+\beta$.

The deviation distance may be a deviation distance of the candidate virtual character object in the preset panel or the three-dimensional scene picture relative to the reference object, that is, a distance between the candidate virtual character object and the reference object in the preset panel or the three-dimensional scene picture. The preset panel may include a screen on which the graphic user interface is located. For example, referring to FIG. 8, in the graphic user interface, a target point A representing a virtual character object a, a target point B representing a virtual character object b, and a target point C representing a reference object c may be included. A deviation distance of the target point A relative to the target point C is La, and a deviation distance of the target point B relative to the target point C is Lb.

406: Obtain a selection weight of each candidate virtual character object in the candidate object set according to the deviation parameter, to obtain the selection weight of each candidate virtual character object in the candidate object set.

The selection weight of the candidate virtual character object may be set in a manner such that a larger deviation parameter indicates a smaller selection weight.

For example, in an embodiment, when the deviation parameter includes the deviation angle, the selection weight of the candidate virtual character object may be set according to a rule that a larger deviation angle indicates a smaller selection weight, and a smaller deviation angle indicates a larger selection weight. For example, referring to FIG. 8, a deviation angle of the virtual character object a is smaller than a deviation angle of the virtual character object b. Therefore, a selection weight of the virtual character object a is higher than a selection weight of the virtual character object b.

For another example, in an embodiment, when the deviation parameter includes the deviation distance, the selection weight of the candidate virtual character object may be set according to a rule that a larger deviation distance indicates a smaller selection weight, and a smaller deviation distance indicates a larger selection weight. For example, referring to FIG. 8, a deviation distance of the virtual character object a is smaller than a deviation distance of the virtual character object b. Therefore, a selection weight of the virtual character object a is higher than a selection weight of the virtual character object b.

For example, when the deviation parameter includes the deviation angle and the deviation distance, a weight reference parameter of the candidate virtual character object may be obtained according to the deviation angle and the deviation distance of the candidate virtual character object, and then a selection weight of the candidate virtual character object is set based on the weight reference parameter. The weight reference parameter is used to indicate a parameter obtained or set by the selection weight. The parameter may be a self-defined parameter.

There may be a plurality of manners of obtaining the weight reference parameter. For example, a weighted sum of the deviation angle and the deviation distance may be calculated, and the weighted sum is used as the weight reference parameter. For example, referring to FIG. 8, the deviation angle of the target point A relative to the target point C is $\theta$, and the deviation distance is La. In this case, a weight reference parameter of a candidate virtual character object A is $QA=\theta*p1+La*p2$, p1 is a weight value of the deviation angle, and p2 is a weight value of the deviation distance.

407: Select one or at least two target virtual character objects from the candidate object set according to the selection weights of the candidate virtual character objects.

In an embodiment, when a target virtual character object is configured and selected, after a selection weight of each candidate virtual character object is obtained, a candidate virtual character object with a highest selection weight may be selected as the target virtual character object to which a skill is released. Alternatively, a candidate virtual character object with a selection weight that is between the highest selection weight and a lowest selection weight may be selected as the target virtual character object to which a skill is released.

For example, referring to FIG. 10, using an example in which the graphic user interface is an FPS game interface, assuming that the game interface includes virtual character objects A and B, when the user presses an upper right skill key, the object selection instruction is triggered to be generated, and a skill release control aperture object 31 and a virtual joystick object 32 are simultaneously displayed at a predetermined location. In this case, the terminal may determine, according to the object selection instruction, that the virtual character objects A and B are candidate virtual character objects to which a skill is released. Then, the terminal obtains deviation parameters (such as a deviation angle and/or deviation record) of the objects A and B relative to the reference object (such as a game camera). The terminal calculates, according to the deviation parameters of the objects A and B, the selection weight of the object A to be 0.7 and the selection weight of the object B to be 0.3. In this case, the candidate virtual character object A may be selected as the target virtual character object to which a skill is released, a selected box is displayed on the virtual character object A of the game interface.

In an embodiment, when a plurality of target virtual character objects is configured and selected, each candidate virtual character may be obtained.

After the selection weights of the objects are obtained, several first candidate virtual character objects with highest selection weights are selected as target virtual character objects to which a skill is released.

For example, referring to FIG. 13, using an example in which the graphic user interface is an FPS game interface, assuming that the game interface includes virtual objects A, B, and C, when the user presses an upper right skill key, the object selection instruction is triggered to be generated, and a skill release control aperture object 31 and a virtual joystick object 32 are simultaneously displayed at a predetermined location. In this case, the terminal may determine, according to the object selection instruction, that the virtual character objects A, B, and C are candidate virtual character objects to which a skill is released. Then, the terminal obtains deviation parameters (such as a deviation angle and/or deviation distance) of the objects A, B, and C relative to the reference object (such as a game camera). The terminal calculates, according to the deviation parameters of the objects A, B, and C, the selection weight of the object A to be 0.5, the selection weight of the object B to be 0.3, and the selection weight of the object C to be 0.2. In this case, the candidate virtual character objects A and B may be selected as the target virtual character objects to which a skill is released, and a selected box is displayed on the virtual character objects A and B of the game interface.

408: Perform a skill release operation of the skill object on one or more target virtual character objects when a skill release confirmation operation of the skill object is detected.

There may be a plurality of skill release confirmation operations. For example, when a skill release auxiliary control object is displayed, the skill release confirmation operation may include a release operation of a drag operation of the virtual joystick object. That is, the skill release operation of the skill object is performed on the target virtual character object in a case that a release operation of the drag operation is detected.

For example, referring to FIG. 10, when the release operation of the drag operation is detected, the skill release operation of the skill object is performed on the target virtual character object.

It may be learned from the above that in an example embodiment of the disclosure, at least one virtual character object is rendered in a game interface, a plurality of candidate virtual character objects to which a skilled is released is determined in the at least one virtual character object according to an object selection instruction, to obtain a candidate object set; deviation parameters of the candidate virtual character objects in the candidate object set relative to a reference object are obtained, and a target virtual character object to which a skill is released is selected from the candidate object set according to the deviation parameter. In this solution, the target virtual character object to which a skill is released may be selected based on the deviation parameter of the virtual character object relative to the reference object, the user can quickly and accurately determine the object to which a skill is released without performing an accurate skill release operation, thereby improving accuracy of an interaction result and reducing resources of the terminal.

To better implement the object selection method provided in an example embodiment of the disclosure, an embodiment further provides an object selection apparatus. Nouns have meanings the same as those in the foregoing object selection method, and for example implementation details, the descriptions in the foregoing method embodiments may be referred to.

Figure 19:
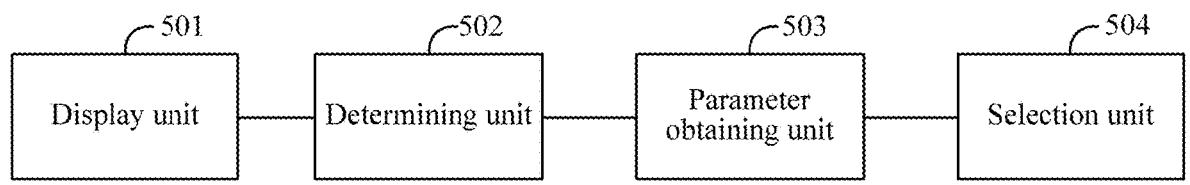
FIG. 19 is a first schematic structural diagram of an object selection apparatus according to an example embodiment.

In an embodiment, an object selection apparatus is further provided. As shown in FIG. 19, the object selection apparatus may include a display unit 501, a determining unit 502, a parameter obtaining unit 503, and a selection unit 504 as follows:

The display unit 501 is configured to display a graphic user interface, the graphic user interface including at least one virtual object.

The determining unit 502 is configured to determine, in the at least one virtual object according to an object selection instruction, a candidate virtual object to which a skill is released, to obtain a candidate object set.

The parameter obtaining unit 503 is configured to obtain a deviation parameter of the candidate virtual object in the candidate object set relative to a reference object.

The selection unit 504 is configured to select, from the candidate object set according to the deviation parameter, a target virtual object to which a skill is released.

Figure 20:
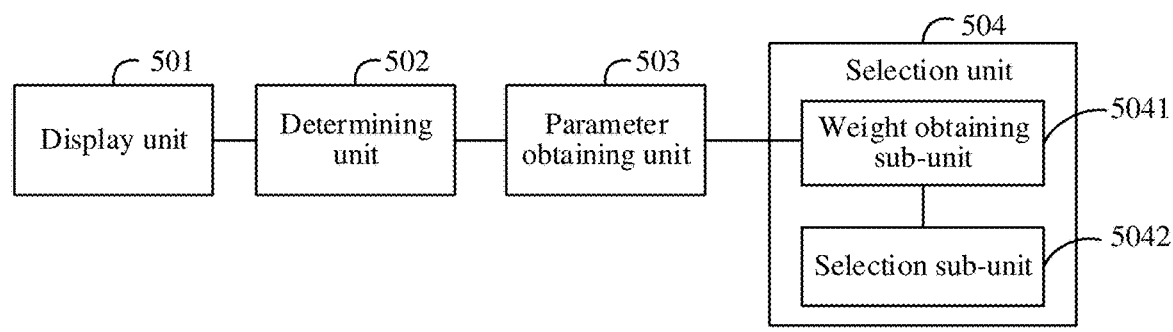
FIG. 20 is a second schematic structural diagram of an object selection apparatus according to an example embodiment.

In an embodiment, the candidate object set includes at least two candidate virtual objects. Referring to FIG. 20, the selection unit 504 includes:

a weight obtaining sub-unit 5041, configured to obtain selection weights of the candidate virtual objects according to the deviation parameter, to obtain a selection weight of each candidate virtual object in the candidate object set; and a selection sub-unit 5042, configured to select, from the candidate object set according to the selection weight of each candidate virtual object in the candidate object set, a target virtual object to which a skill is released or at least two target virtual objects to which a skill is released.

In an embodiment, the deviation parameter includes a deviation angle and a deviation distance, and the weight obtaining sub-unit 5041 is configured to:

obtain weight reference parameters of the candidate virtual objects according to the deviation angle and the deviation distance; and obtain the selection weights of the candidate virtual objects according to the weight reference parameters of the candidate virtual objects.

In an embodiment, the candidate object set includes a candidate virtual object, and the selection unit 504 is configured to: determine whether the deviation parameter meets a preset condition; and select the candidate virtual object as the target virtual object to which a skill is released in a case that the deviation parameter meets the preset condition.

In an embodiment, the determining unit 502 is configured to:

obtain a field of view of a camera component according to the object selection instruction, the camera component being configured to render a scene in the graphic user interface; and determine, in the at least one virtual object according to the field of view, the candidate virtual object to which a skill is to be released.

Figure 21:
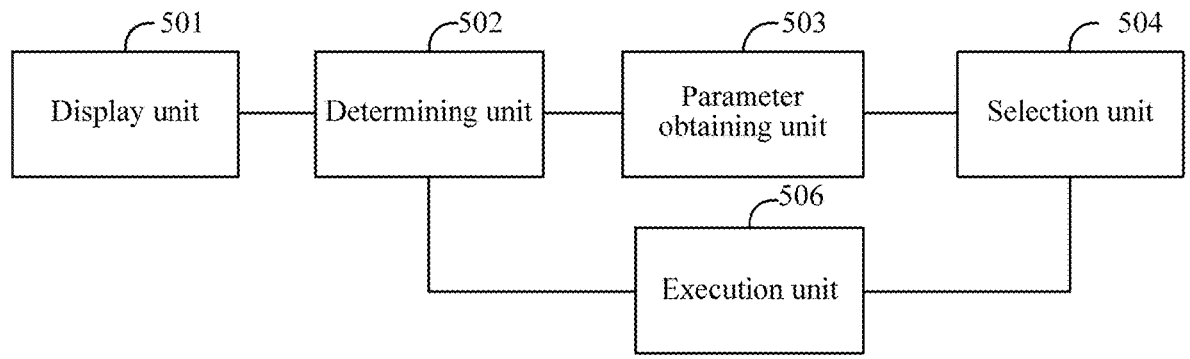
FIG. 21 is a third schematic structural diagram of an object selection apparatus according to an example embodiment.

In an embodiment, the graphic user interface further includes a skill operation area, and the skill operation area includes a skill object. Referring to FIG. 21, the determining unit 502 may be configured to: trigger generating the object selection instruction in a case that a skill release trigger operation of the skill object is detected; and determine, in the at least one virtual object according to the object selection instruction, the candidate virtual object to which a skill is released; and the object selection apparatus further includes an execution unit 506, where the execution unit 506 is configured to perform a skill release operation of the skill object on the target virtual object in a case that a skill release confirmation operation of the skill object is detected, where in an embodiment, the determining unit 502 may be configured to display a skill release auxiliary control object at a preset location on the graphic user interface in a case that the skill release trigger operation of the skill object is detected; and control, according to an operation on the skill release auxiliary control object, a skill release location of the skill object to be correspondingly adjusted in the graphic user interface and trigger an object selection instruction.

The skill release auxiliary control object may include a skill release control aperture object and a virtual joystick object located within a radiation range of the skill release control aperture object; and the execution unit 506 may be configured to perform a skill release operation of the skill object on the target virtual object in a case that a skill release confirmation operation of the skill object is detected.

For example, the execution unit 506 may be configured to control, in a case that a drag operation on the virtual joystick object is detected, the skill release location of the skill object to be correspondingly adjusted in the graphic user interface and re-trigger an object selection instruction, and return to perform the operation of determining the candidate virtual object.

In an embodiment, the execution unit 506 is configured to perform the skill release operation of the skill object on the target virtual object in a case that a release operation of the drag operation is detected.

In an embodiment, the determining unit 502 may be configured to: automatically trigger generating the object selection instruction in a case that skill release is in a sustained release mode; and determine, in the at least one virtual object according to the object selection instruction, the candidate virtual object to which a skill is released.

In an example implementation, the foregoing units may be implemented as independent entities, or may be randomly combined, or may be implemented as a same entity or several entities. For example implementation(s) of the foregoing units, the foregoing method embodiments may be referred to. Details are not described herein again.

The object selection apparatus may be specifically integrated in the terminal, for example, is integrated in the terminal in a form of a client. The terminal may be a device such as a mobile phone and a tablet computer.

It can be learned from the above that in the object selection apparatus in an example embodiment of the disclosure, the display unit 501 displays a graphic user interface, the graphic user interface including at least one virtual object, the determining unit 502 determines, in the at least one virtual object according to an object selection instruction, a candidate virtual object to which a skill is released, to obtain a candidate object set, the parameter obtaining unit 503 obtains a deviation parameter of the candidate virtual object in the candidate object set relative to a reference object, and the selection unit 504 selects, from the candidate object set according to the deviation parameter, a target virtual object to which a skill is released. In this solution, the target virtual object to which a skill is released may be selected based on the deviation parameter of the virtual object relative to the reference object, the user can quickly and accurately determine the object to which a skill is released without performing an accurate skill release operation, thereby improving accuracy of an interaction result and reducing resources of the terminal.

Embodiment 4

To better implement the foregoing method, an example embodiment further provides a terminal. The terminal may be a device such as a mobile phone and a tablet computer.

Figure 22:
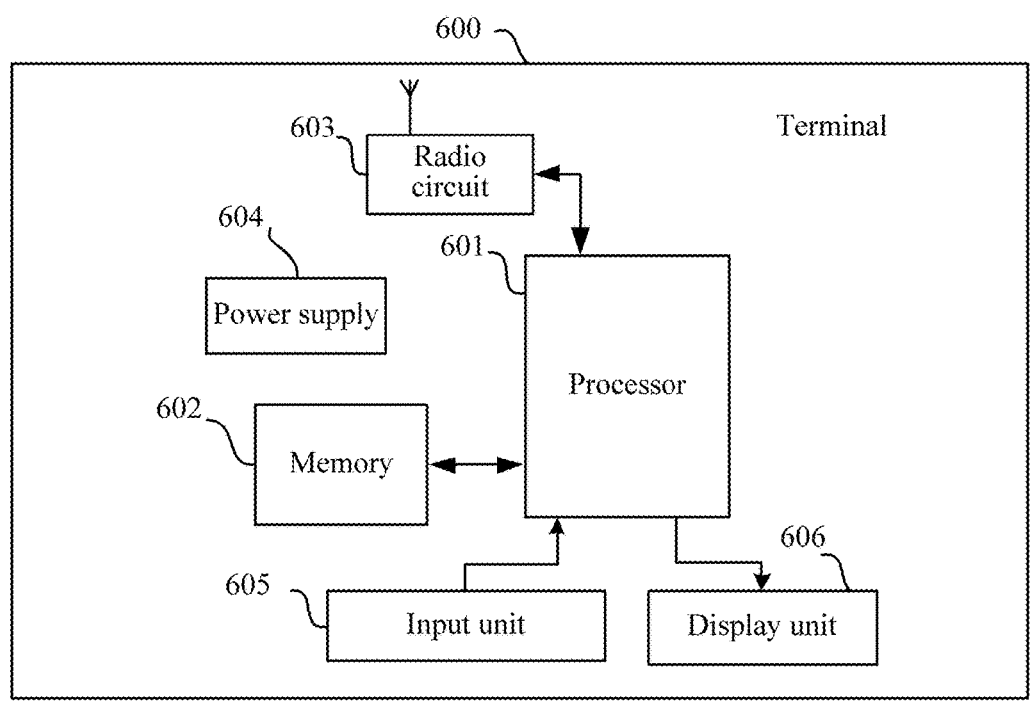
FIG. 22 is a schematic structural diagram of a terminal according to an example embodiment.

Referring to FIG. 22, an example embodiment provides a terminal 600, which may include components such as a processor 601 including one or more processing cores, a memory 602 including one or more computer readable storage media, a radio frequency (RF) circuit 603, a power supply 604, an input unit 605, and a display unit 606. A person skilled in the art should understand that the structure of the terminal shown in FIG. 4 does not constitute a limitation to the terminal, and the terminal may include more components or fewer components than those shown in the figure, or some components may be combined, or a different component deployment may be used.

The processor 601 is a control center of the terminal, connects each part of the whole terminal by using various interfaces and lines, and performs various functions and data processing of the terminal by operating or executing the software programs and/or modules stored in the memory 602 and invoking the data stored in the memory 602, to perform overall monitoring of the terminal. Optionally, the processor 601 may include one or more processor cores. In an example embodiment, the processor 601 may integrate an application processor and a modem. The application processor mainly processes an operating system, a user interface, an application program, and the like. The modem mainly processes wireless communication. It may be understood that the foregoing modem may alternatively not be integrated into the processor 601.

The memory 602 may be configured to store a software program and module. The processor 601 runs the software program and module stored in the memory 602, to execute various functional applications and data processing.

The RF circuit 603 may be configured to receive and send signals during information receiving and sending. Particularly, the RF circuit 601 receives downlink information from a base station, then delivers the downlink information to one or more processors 401 for processing, and sends related uplink data to the base station.

The mobile terminal further includes the power supply 604 (such as a battery) for supplying power to the components. In an example embodiment, the power supply may be logically connected to the processor 601 by using a power management system, thereby implementing functions such as charging, discharging and power consumption management by using the power management system. The power supply 604 may further include one or more of a direct current or alternating current power supply, a re-charging system, a power failure detection circuit, a power supply converter or inverter, a power supply state indicator, and any other component.

The terminal may further include the input unit 605. The input unit 605 may be configured to receive entered numeric or character information and generate keyboard, mouse, joystick, optical, or trackball signal input related to user settings and function control.

The terminal may further include the display unit 606. The display unit 606 may be configured to display information entered by the user or information provided to the user, and graphical user interfaces of the terminal. The graphical user interfaces each may include an image, text, an icon, a video, or any combination thereof. The display unit 608 may include a display panel. Optionally, the display panel may be configured in a form of a liquid crystal display (LCD), an organic light-emitting diode (OLED), or the like.

In an example embodiment, the processor 601 in the terminal may load executable files corresponding processes of the one or more application programs to the memory 602 according to the following computer readable instructions, and runs the application programs stored in the memory 602, so as to implement various functions as follows:

displaying a graphic user interface, the graphic user interface including at least one virtual object; determining, in the at least one virtual object according to an object selection instruction, a candidate virtual object to which a skill is released, to obtain a candidate object set; obtaining a deviation parameter of the candidate virtual object in the candidate object set relative to a reference object; and selecting, from the candidate object set according to the deviation parameter, a target virtual object to which a skill is released.

A person of ordinary skill in the art should understand that all or part of the operations of the methods in the foregoing embodiments may be implemented by a program instructing relevant hardware. The program may be stored in a computer-readable storage medium. The storage medium may include: a read-only memory (ROM), a random access memory (RAM), a magnetic disk, a compact disc, or the like.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

The object selection method and apparatus, the terminal, and the storage medium provided in the example embodiments of the disclosure are described above in detail. Although the principles and implementations of the disclosure are described by using specific examples in the specification, the foregoing descriptions of the embodiments are only intended to help understand the method and core idea of the method of the disclosure. A person of ordinary skill in the art may make modifications to the specific implementations and application range according to the idea of the disclosure. In conclusion, the content of the specification should not be construed as a limitation to the disclosure.

What is claimed is:

1. An object selection method, applied to a terminal, comprising:

displaying a graphic user interface, the graphic user interface comprising at least one virtual object and a skill operation area;

based on detection of a skill release trigger operation on the skill operation area, displaying a skill release auxiliary control object on the graphic user interface, the skill release auxiliary control object comprising a skill release control aperture object and a virtual joystick object located within a radiation range of the skill release control aperture object;

based on detection of a user operation to move the virtual joystick object to a certain location on the skill release control aperture object, triggering an object selection instruction;

determining, from the at least one virtual object according to the object selection instruction, at least one candidate virtual object to which a skill is released, to obtain a candidate object set;

determining, as a reference object, a location of a camera component corresponding to the certain location on the skill release control aperture object, the camera component being configured to render a scene in the graphic user interface;

obtaining a deviation parameter of each of the at least one candidate virtual object in the candidate object set, the deviation parameter being relative to the reference object; and selecting, from the candidate object set according to the deviation parameter, at least one target virtual object to which the skill is released and updating the graphic user interface to include a visual indication of the at least one target virtual object being selected.

2. The object selection method according to claim 1, wherein the candidate object set comprises at least two candidate virtual objects, and the selecting comprises:
obtaining selection weights of the at least two candidate virtual objects according to respective deviation parameters of the at least two candidate virtual objects, to obtain a selection weight of each of the at least one candidate virtual object in the candidate object set; and
selecting, from the candidate object set according to the selection weight of each of the at least one candidate virtual object, the at least one target virtual object to which the skill is released.

3. The object selection method according to claim 2, wherein the deviation parameter comprises at least one of a deviation angle relative to the reference object and a deviation distance relative to the reference object, and the obtaining the selection weights of the at least two candidate virtual objects comprises:
obtaining weight reference parameters of the at least two candidate virtual objects according to the at least one of the deviation angle and the deviation distance; and
obtaining the selection weights of the at least two candidate virtual objects according to the weight reference parameters of the at least two candidate virtual objects.

4. The object selection method according to claim 1, wherein the candidate object set comprises one candidate virtual object, and the selecting comprises:
determining whether the deviation parameter of the one candidate virtual object meets a preset condition; and
selecting the one candidate virtual object as the at least one target virtual object to which the skill is released based on the deviation parameter satisfying the preset condition.

5. The object selection method according to claim 1, wherein the determining the at least one candidate virtual object comprises:
obtaining a field of view of the camera component according to the certain location on the skill release control aperture object; and
determining, according to the field of view of the camera component, the at least one candidate virtual object to which the skill is to be released.

6. The object selection method according to claim 1, wherein the user operation to move the virtual joystick object comprises a drag operation on the virtual joystick object to the certain location on the skill release control aperture object.

7. The object selection method according to claim 1, wherein the determining the at least one candidate virtual object comprises:
automatically triggering generating the object selection instruction in a predetermined release mode; and
determining, from the at least one virtual object according to the object selection instruction, the at least one candidate virtual object to which the skill is released.

8. A terminal, comprising:
at least one memory operable to store program code; and
at least one processor operable to read the program code and operate as instructed by the program code, the program code comprising:
displaying code configured to cause at least one of the at least one processor to display a graphic user interface, the graphic user interface comprising at least one virtual object and a skill operation area;
control object displaying code configured to cause at least one of the at least one processor to, based on detection of a skill release trigger operation on the skill operation area, display a skill release auxiliary control object on the graphic user interface, the skill release auxiliary control object comprising a skill release control aperture object and a virtual joystick object located within a radiation range of the skill release control aperture object;
triggering code configured to cause at least one of the at least one processor to, based on detection of a user operation to move the virtual joystick object to a certain location on the skill release control aperture object, trigger an object selection instruction;
first determining code configured to cause at least one of the at least one processor to determine, from the at least one virtual object according to the object selection instruction, at least one candidate virtual object to which a skill is released, to obtain a candidate object set;
second determining code configured to cause at least one of the at least one processor to determine, as a reference object, a location of a camera component corresponding to the certain location on the skill release control aperture object, the camera component being configured to render a scene in the graphic user interface;
obtaining code configured to cause at least one of the at least one processor to obtain a deviation parameter of each of the at least one candidate virtual object in the candidate object set, the deviation parameter being relative to the reference object; and
selecting code configured to cause at least one of the at least one processor to select, from the candidate object set according to the deviation parameter, at least one target virtual object to which the skill is released and update the graphic user interface to include a visual indication of the at least one target virtual object being selected.

9. The terminal according to claim 8, wherein the candidate object set comprises at least two candidate virtual objects, and the selecting code causes at least one of the at least one processor to perform:
obtaining selection weights of the at least two candidate virtual objects according to respective deviation parameters of the at least two candidate virtual objects, to obtain a selection weight of each of the at least one candidate virtual object in the candidate object set; and
selecting, from the candidate object set according to the selection weight of each of the at least one candidate virtual object, the at least one target virtual object to which the skill is released.

10. The terminal according to claim 9, wherein the deviation parameter comprises at least one of a deviation angle relative to the reference object and a deviation distance relative to the reference object, and the obtaining the selection weights of the at least two candidate virtual objects:
obtaining weight reference parameters of the at least two candidate virtual objects according to the at least one of the deviation angle and the deviation distance; and
obtaining the selection weights of the at least two candidate virtual objects according to the weight reference parameters of the at least two candidate virtual objects.

11. The terminal according to claim 8, wherein the candidate object set comprises one candidate virtual object, and the selecting code causes at least one of the at least one processor to perform:
 determining whether the deviation parameter of the one candidate virtual object meets a preset condition; and
 selecting the one candidate virtual object as the at least one target virtual object to which the skill is released based on the deviation parameter satisfying the preset condition.

12. The terminal according to claim 8, wherein the first determining code causes at least one of the at least one processor to perform:
 obtaining a field of view of the camera component according to the certain location on the skill release control aperture object; and
 determining, according to the field of view of the camera component, the at least one candidate virtual object to which the skill is to be released.

13. A non-transitory computer readable storage medium, storing computer readable instructions executable by at least one processor to perform:
 displaying a graphic user interface, the graphic user interface comprising at least one virtual object and a skill operation area;
 based on detection of a skill release trigger operation on the skill operation area, displaying a skill release auxiliary control object on the graphic user interface, the skill release auxiliary control object comprising a skill release control aperture object and a virtual joystick object located within a radiation range of the skill release control aperture object;
 based on detection of a user operation to move the virtual joystick object to a certain location on the skill release control aperture object, triggering an object selection instruction;
 determining, from the at least one virtual object according to the object selection instruction, at least one candidate virtual object to which a skill is released, to obtain a candidate object set;
 determining, as a reference object, a location of a camera component corresponding to the certain location on the skill release control aperture object, the camera component being configured to render a scene in the graphic user interface;
 obtaining a deviation parameter of each of the at least one candidate virtual object in the candidate object set, the deviation parameter being relative to the reference object; and
 selecting, from the candidate object set according to the deviation parameter, at least one target virtual object to which the skill is released and updating the graphic user interface to include a visual indication of the at least one target virtual object being selected.

14. The storage medium according to claim 13, wherein the candidate object set comprises at least two candidate virtual objects, and in the selecting the at least one target virtual object, the computer readable instructions further cause the at least one processor to perform:
 obtaining selection weights of the at least two candidate virtual objects according to respective deviation parameters of the at least two candidate virtual objects, to obtain a selection weight of each of the at least one candidate virtual object in the candidate object set; and
 selecting, from the candidate object set according to the selection weight of each of the at least one candidate virtual object, the at least one target virtual object to which the skill is released.

15. The storage medium according to claim 14, wherein the deviation parameter comprises at least one of a deviation angle relative to the reference object and a deviation distance relative to the reference object, and in the obtaining the selection weights of the at least two candidate virtual objects, the computer readable instructions further cause the at least one processor to perform:
 obtaining weight reference parameters of the at least two candidate virtual objects according to the at least one of the deviation angle and the deviation distance; and
 obtaining the selection weights of the at least two candidate virtual objects according to the weight reference parameters of the at least two candidate virtual objects.

16. The storage medium according to claim 13, wherein the candidate object set comprises one candidate virtual object, and in selecting the at least one target virtual object, the computer readable instructions further cause the at least one processor to perform:
 determining whether the deviation parameter of the one candidate virtual object meets a preset condition; and
 selecting the one candidate virtual object as the at least one target virtual object to which the skill is released based on that the deviation parameter satisfying the preset condition.

17. The storage medium according to claim 13, wherein in determining the at least one candidate virtual object, the computer readable instructions further cause the at least one processor to perform:
 obtaining a field of view of the camera component according to the certain location on the skill release control aperture object; and
 determining, according to the field of view of the camera component, the at least one candidate virtual object to which the skill is to be released.

* * * * *